US011632197B2

(12) United States Patent
Chin et al.

(10) Patent No.: US 11,632,197 B2
(45) Date of Patent: Apr. 18, 2023

(54) METHODS AND APPARATUSES FOR HANDLING RETRANSMISSION ON CONFIGURED UPLINK GRANT RESOURCES

(71) Applicant: FG Innovation Company Limited, Tuen Mun (HK)

(72) Inventors: Heng-Li Chin, Taipei (TW); Hsin-Hsi Tsai, Taipei (TW); Mei-Ju Shih, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 64 days.

(21) Appl. No.: 17/038,417

(22) Filed: Sep. 30, 2020

(65) Prior Publication Data

US 2021/0105096 A1 Apr. 8, 2021

Related U.S. Application Data

(60) Provisional application No. 62/909,950, filed on Oct. 3, 2019.

(51) Int. Cl.
*H04L 1/18* (2023.01)
*H04L 29/08* (2006.01)
(Continued)

(52) U.S. Cl.
CPC .......... *H04L 1/1812* (2013.01); *H04L 1/1874* (2013.01); *H04L 1/1887* (2013.01); *H04L 69/322* (2013.01)

(58) Field of Classification Search
CPC ... H04L 1/1812; H04L 1/1874; H04L 1/1887; H04L 69/322
See application file for complete search history.

(56) References Cited

U.S. PATENT DOCUMENTS

2020/0366423 A1* 11/2020 Lee ...................... H04L 5/0092
2020/0367097 A1* 11/2020 Tarimala ........... H04W 74/0833
2021/0274555 A1* 9/2021 Alfarhan ........... H04W 74/0808

FOREIGN PATENT DOCUMENTS

| CN | 101971548 A | 2/2011 |
| CN | 107624261 A | 1/2018 |
| WO | 2017078319 A1 | 5/2017 |

OTHER PUBLICATIONS

3GPP TR 38.889, "3rd Generation Partnership Project; Technical Specification Group Radio Access Network; Study on NR-based access to unlicensed spectrum (Release 16)", V16.0.0 (Dec. 2018).
(Continued)

*Primary Examiner* — Melvin C Marcelo
(74) *Attorney, Agent, or Firm* — ScienBiziP, P.C.

(57) ABSTRACT

A user equipment (UE) includes a processor coupled to the one or more non-transitory computer-readable media containing computer-executable instructions embodied therein. The processor is configured to execute the computer-executable instructions to determine a transmission of a Medium Access Control (MAC) protocol data unit (PDU) using a first uplink (UL) resource associated with a first configured grant (CG) configuration has not been successfully performed, the first UL resource being associated with a first hybrid automatic repeat request (HARQ) process, and the MAC PDU being obtained for the first HARQ process; receive a second CG configuration associated with a second UL resource for another transmission, the second UL resource being associated with a second HARQ process; and transmit the MAC PDU on the second UL resource when it is determined that the second UL resource is suitable for transmitting the MAC PDU.

20 Claims, 9 Drawing Sheets

(51) Int. Cl.
*H04L 1/1812* (2023.01)
*H04L 69/322* (2022.01)
*H04L 1/1867* (2023.01)

(56) References Cited

OTHER PUBLICATIONS

3GPP TS 38.321, "3rd Generation Partnership Project; Technical Specification Group Radio Access Network; NR; Medium Access Control (MAC) protocol specification (Release 15)", V15.6.0 (Jun. 2019).
3GPP TS 38.331, "3rd Generation Partnership Project; Technical Specification Group Radio Access Network; NR; Radio Resource Control (RRC) protocol specification (Release 15)", V15.6.0 (Jun. 2019).

* cited by examiner

METHODS AND APPARATUSES FOR HANDLING RETRANSMISSION ON CONFIGURED UPLINK GRANT RESOURCES

CROSS-REFERENCE TO RELATED APPLICATION(S)

The present disclosure claims the benefit of and priority of provisional U.S. Patent Application Ser. No. 62/909,950, filed on Oct. 3, 2019, entitled "Method and Apparatus to Handle Uplink Transmission in Unlicensed Spectrum" ("the '950 provisional"). The disclosure of the '950 provisional is hereby incorporated fully by reference into the present disclosure for all purposes.

FIELD

The present disclosure is related to wireless communication, and more particularly, to methods and apparatuses for handling (re)transmission on configured uplink grant resources.

BACKGROUND

New Radio (NR)-based access to unlicensed spectrum has been agreed by the 3rd Generation Partnership Project (3GPP) as one of the Work Items (WIs) for Release-16. This WI specifies NR enhancements for a single global solution framework for access to unlicensed spectrum which enables operations of NR in the unlicensed bands (e.g., 5 GHz and 6 GHz bands) taking into account of regional regulatory requirements. The NR-Unlicensed (NR-U) design should enable fair coexistence between already deployed Wireless-Fidelity (Wi-Fi) generations and NR-U, between NR-U and Long Term Evolution-License-Assisted Access (LTE-LAA), between different NR-U systems, etc.

NR already defines Type 1 and Type 2 configured grant mechanisms. These two types of configured grant mechanisms are also included in NR-U operations. For the retransmission of a HARQ process that was initially transmitted via configured uplink grant resource, both retransmission via the same configured uplink grant resource and retransmission via resource scheduled by UL grant are supported. However, there exists a need for further improvements in the art.

SUMMARY

The present disclosure is related to methods and apparatuses for SL operations.

According to a first aspect of the present disclosure, a user equipment (UE) is provided. The UE includes one or more non-transitory computer-readable media containing computer-executable instructions embodied therein, and at least one processor coupled to the one or more non-transitory computer-readable media. The at least one processor is configured to execute the computer-executable instructions to determine a transmission of a Medium Access Control (MAC) protocol data unit (PDU) using a first uplink (UL) resource associated with a first configured grant (CG) configuration has not been successfully performed, the first UL resource being associated with a first hybrid automatic repeat request (HARQ) process, and the MAC PDU being obtained for the first HARQ process; receive a second CG configuration associated with a second UL resource for another transmission, the second UL resource being associated with a second HARQ process; and transmit the MAC PDU on the second UL resource when it is determined that the second UL resource is suitable for transmitting the MAC PDU.

In an implementation of the first aspect, the second UL resource is suitable for the transmission of the MAC PDU if at least one of the following conditions is satisfied: the second UL resource for the another transmission is used for a new transmission or a retransmission; the first HARQ process has the same HARQ process ID as the second HARQ process; the second UL resource being scheduled on a same bandwidth part (BWP) as the first UL resource; the second UL resource having a same size as the first UL resource; the second CG configuration associated with the second UL resource being the same as the first CG configuration associated with the first UL resource; and the second UL resource is a prioritized UL resource.

In another implementation of the first aspect, the at least one processor is further configured to execute the computer-executable instructions to generate a new MAC PDU and transmit the new MAC PDU on the second UL resource when it is determined that the second UL resource is not suitable for the transmission of the MAC PDU.

In yet another implementation of the first aspect, the second UL resource is for the another transmission is used for a new transmission, if at least one of the following conditions is satisfied: a configured grant timer for the second HARQ process is not running; and repetition is not configured for the second CG configuration.

In yet another implementation of the first aspect, the transmission of the MAC PDU using the first UL resource associated with the first CG configuration having not been successfully performed is due to the first UL resource associated with the first CG configuration being deprioritized.

In yet another implementation of the first aspect, when the transmission of the MAC PDU using the first UL resource associated with the first CG configuration has not been successfully performed, the MAC PDU remains in a HARQ buffer associated with the first HARQ process.

In yet another implementation of the first aspect, the transmission of the MAC PDU using the first UL resource associated with the first CG configuration having not been successfully performed is due to a UL Listen-Before-Talk (LBT) failure.

In yet another implementation of the first aspect, the at least one processor is further configured to execute the computer-executable instructions to increment an LBT counter (LBT_COUNTER) based on the UL LBT failure; and transmit a secondary cell group (SCG) failure report when the LBT_COUNTER reaches a threshold value (MaxLBT threshold) configured on a bandwidth part (BWP) where the first UL resource is scheduled, and the BWP belongs a Primary Secondary Cell (PSCell).

In yet another implementation of the first aspect, the SCG failure report is transmitted when consistent UL LBT failures have been detected on all BWPs configured with PRACH resources on the PSCell.

In yet another implementation of the first aspect, the SCG failure report includes a failure type (failure Type) information element (IE) indicating the failure type as SCG-LBT failure (scg-lbtFailure).

According to a second aspect of the present disclosure, a method for wireless communication performed by a UE is provided. The method includes determining a transmission of a Medium Access Control (MAC) protocol data unit (PDU) using a first uplink (UL) resource associated with a first configured grant (CG) configuration has not been successfully performed, the first UL resource being associated with a first hybrid automatic repeat request (HARQ) process, and the MAC PDU being obtained for the first HARQ process; receiving a second CG configuration associated with a second UL resource for another transmission, the second UL resource being associated with a second HARQ process; and transmitting the MAC PDU on the second UL resource when it is determined that the second UL resource is suitable for transmitting the MAC PDU.

In an implementation of the second aspect, the second UL resource is suitable for the transmission of the MAC PDU if at least one of the following conditions is satisfied: the second UL resource for the another transmission is used for a new transmission or a retransmission; the first HARQ process has the same HARQ process ID as the second HARQ process; the second UL resource being scheduled on a same bandwidth part (BWP) as the first UL resource; the second UL resource having a same size as the first UL resource; the second CG configuration associated with the second UL resource being the same as the first CG configuration associated with the first UL resource; and the second UL resource is a prioritized UL resource.

In another implementation of the second aspect, the method further comprises generating a new MAC PDU and transmitting the new MAC PDU on the second UL resource when it is determined that the second UL resource is suitable for the transmission of the MAC PDU.

In yet another implementation of the second aspect, the second UL resource is for the another transmission is used for a new transmission, if at least one of the following conditions is satisfied: a configured grant timer for the second HARQ process is not running; and repetition is not configured for the second CG configuration.

In yet another implementation of the second aspect, the transmission of the MAC PDU using the first UL resource associated with the first CG configuration having not been successfully performed is due to the first UL resource associated with the first CG configuration being deprioritized.

In yet another implementation of the second aspect, when the transmission of the MAC PDU using the first UL resource associated with the first CG configuration has not been successfully performed, the MAC PDU remains in a HARQ buffer associated with the first HARQ process.

In yet another implementation of the second aspect, the transmission of the MAC PDU using the first UL resource associated with the first CG configuration having not been successfully performed is due to a UL Listen-Before-Talk (LBT) failure.

In yet another implementation of the second aspect, the method further comprises: incrementing an LBT counter (LBT_COUNTER) based on the UL LBT failure; and transmitting a secondary cell group (SCG) failure report when the LBT_COUNTER reaches a threshold value (MaxLBT threshold) configured on a bandwidth part (BWP) where the first UL resource is scheduled, and the BWP belongs a Primary Secondary Cell (PSCell).

In yet another implementation of the second aspect, the SCG failure report is transmitted when consistent UL LBT failures have been detected on all BWPs configured with PRACH resources on the PSCell.

In yet another implementation of the second aspect, the SCG failure report includes a failure type (failure Type) information element (IE) indicating the failure type as SCG-LBT failure (scg-lbtFailure).

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
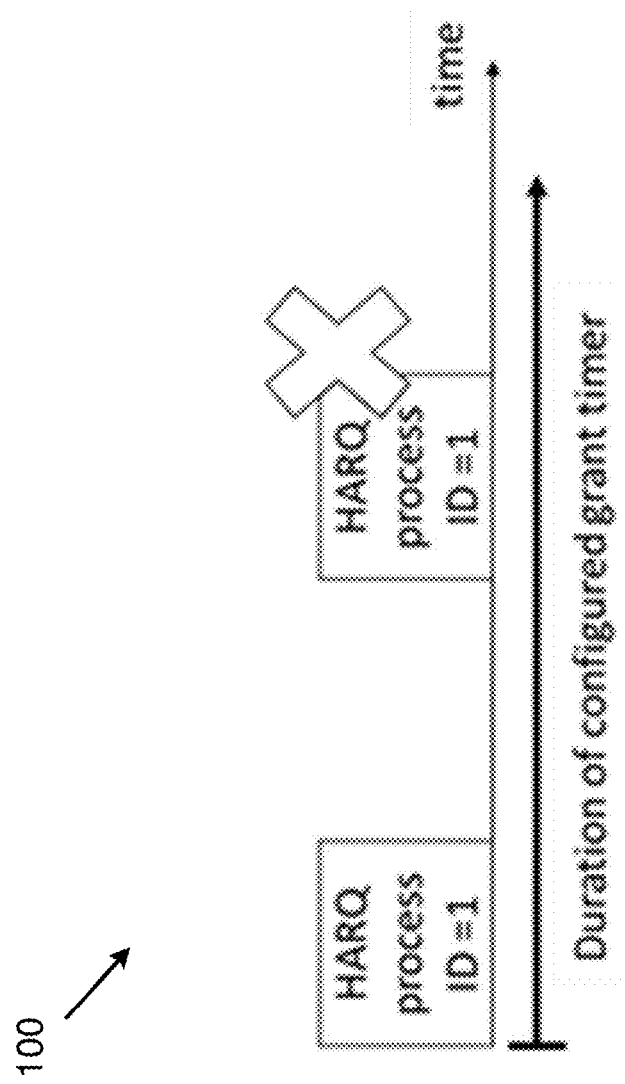
FIG. 1 illustrates a configured grant timer operation in NR.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example description of some selected terms used in this disclosure are given below.

Primary Cell (PCell): For dual connectivity (DC) operation, PCell is the master cell group (MCG) cell, operating on the primary frequency, in which the UE either performs the initial connection establishment procedure or initiates the connection re-establishment procedure.

Primary SCG Cell (PSCell): For DC operation, PSCell is the secondary cell group (SCG) cell in which the UE performs random access when performing the Reconfiguration with Sync procedure.

Special Cell: For DC operation the term Special Cell (SpCell) refers to the PCell of the MCG or the PSCell of the SCG, otherwise the term Special Cell refers to the PCell.

Secondary Cell: For a UE configured with carrier aggregation (CA), a cell providing additional radio resources on top of Special Cell.

Serving Cell: For a UE in RRC_CONNECTED not configured with CA/DC, there is only one serving cell, which may be referred to as the primary cell. For a UE in RRC_CONNECTED configured with CA/DC, the term "serving cells" may be used to denote the set of cells including the SpCell(s) and all secondary cells.

Listen Before Talk (LBT) is a feature available in Wi-Fi that allows coexistence with other Wi-Fi nodes. LBT is a mechanism by which an equipment applies clear channel assessment (CCA) before using the channel. The 3rd Generation Partnership Project (3GPP) chose to specify a conservative LBT scheme similar to what Wi-Fi nodes use in order to ensure coexistence of Licensed Assisted Access (LAA) with Wi-Fi. LAA uses carrier aggregation in DL to combine LTE in the unlicensed spectrum (e.g., 5 GHz) with LTE in the licensed band. In NR, LBT may be also required prior to any transmission when operating on the unlicensed spectrum.

In NR Release-15, a configured grant timer is introduced. This timer is maintained per HARQ process ID. Whenever a UE performs a specific (re-)transmission (e.g., on a resource indicated by an uplink grant addressed to C-RNTI and the identified HARQ process is configured for a configured uplink grant, on a configured UL resource or on a resource indicated by an uplink grant addressed to CS-RNTI), a configured grant timer that corresponds to the HARQ process ID of the (re-)transmission is (re)started. FIG. 1 illustrates a configured grant timer operation in NR. As shown in FIG. 1, while the configured grant timer is running, the UE is prohibited from performing a new transmission (e.g., generate a new TB for transmission) on a configured uplink grant resource (e.g., PUSCH) with the same HARQ process ID as the configured grant timer. For example, the latest PUSCH resource cannot be used for a new transmission.

In an unlicensed spectrum, a UE may perform channel access before performing a transmission in order to make sure that there is no other device occupying the channel where the transmission is intended to be performed. For channel access mechanism in NR-U operations, the LTE-LAALBT mechanism may be adopted as the baseline for 5 GHz band and as the starting point of the design for 6 GHz band. At least for bands where absence of Wi-Fi cannot be guaranteed (e.g. by regulation), LBT may be performed in units of 20 MHz. In general, there are 4 LBT categories. The introduction of each LBT category may be found below. For NR-U operations, a UE may perform LBT using one of the 4 LBT categories before performing an UL transmission for different transmissions in a COT (as defined below) and different channels/signals to be transmitted. Specifically, a UE may perform LBT using different LBT categories before performing RACH, PUCCH, PUSCH and SRS transmissions.

Category 1: Immediate Transmission after a Short Switching Gap

This may be used for a transmitter to immediately transmit after a switching gap inside a COT. More specifically, the switching gap from reception to transmission is to accommodate the transceiver turnaround time and is no longer than 16 µs.

Category 2: LBT without Random Back-Off

The duration of time that the channel (where transmission is intended to be performed) is sensed to be idle before the transmitting entity transmits is deterministic.

Category 3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel (where transmission is intended to be performed) is sensed to be idle before the transmitting entity transmits on the channel.

Category 4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel (where transmission is intended to be performed) is sensed to be idle before the transmitting entity transmits on the channel.

The transmission may be performed by a UE only if the LBT is successful, for example, as explained in each of the LBT categories discussed above. Moreover, the maximum continuous transmission time (upon successful LBT) may be predetermined by a COT value. Based on the concept of LBT mechanism, RAN Working Group 2 (WG2) has agreed to assume that the configured grant timer, which corresponds to the HARQ process of a PUSCH resource of a configured uplink grant is not (re)started if transmission is not performed on a PUSCH resource due to an LBT failure (e.g., LBT is not successful). RAN WG2 also assumes that a pending transport block (TB), which has not been transmitted on a configured uplink grant resource due to an LBT failure, may be (re)transmitted in a (subsequent) configured uplink grant resource (with the same HARQ process).

LBT may be considered successful if the channel is sensed to be idle (e.g., the power detected by a UE, which intends to perform a UL transmission, is less than a predetermined/configured power threshold) for a predetermined/configured duration of time during an LBT procedure, if LBT category 2/3/4 is performed. LBT may be considered successful if the UE performs LBT category 1. Otherwise, an LBT failure may be considered. The MAC entity of the UE may receive an LBT failure indication from the PHY layer of the UE upon one/multiple LBT failure(s).

In various implementations of the present disclosure, the term "UL LBT" may be referred to an LBT procedure performed by the UE before an UL transmission. The term "DL LBT" may be referred to an LBT procedure performed by the network before an DL transmission. Various implementations of the present disclosure describe mechanisms to handle "consistent" UL LBT failures.

A UL LBT failure may delay a UL transmission because it implies the UE has to (re)transmit the data on a subsequent UL resource(s). Moreover, some of the UL transmissions may be initiated by a UE (e.g., CBRA, SR, transmission on a configured uplink grant resource, etc.). Hence, the network may not be aware if the UE fails to perform the UL transmission due to suffering from the UL LBT failure. To address the given issue, the 3GPP RAN WG2 has agreed to introduce a UL LBT failure mechanism, which handles (consistent) UL LBT failure(s) in an NR-U system. Consequently, a LBT recovery procedure may be initiated by the UE upon (consistent) UL LBT failure(s) in order to prevent the UE from suffering UL LBT failures, which may result in further delay of UL transmission.

A counter (e.g., an LBT counter), a timer (e.g., an LBT timer), and a threshold value (e.g., a maximum value or a MaxLBT threshold), may be introduced to the UL LBT failure mechanism. Moreover, the LBT counter, LBT timer, and MaxLBT threshold may be configured and/or maintained per BWP, cell, cell group (CG), or subset of CG. The LBT counter may be initially set to zero upon configuration and may be incremented by the UE each time a UL LBT failure happens. For example, the UL LBT failure may happen upon the MAC entity of a UE receives an LBT failure indication from PHY layer. For example, the UL LBT failure may be caused by any (or specific) UL transmission type. That is, the LBT counter may be incremented when any (or specific) type of UL transmissions cannot be performed due to the detection of a UL LBT failure. In one example, the LBT counter may be increased by one for one (or multiple) UL LBT failure(s) detected by a UE. Moreover, a time window may be configured by the network, such that the LBT counter may only be increased by a specific value within the time window.

In one implementation, an LBT timer may be configured by the network to the UE. In one implementation, the LBT timer may be (re)started when any (or specific) type of UL transmission cannot be performed due to a UL LBT failure. In another implementation, the LBT timer may be (re)started by the UE whenever the LBT counter is incremented. The LBT counter may be reset when the LBT timer expires.

Whenever the LBT counter reaches the MaxLBT threshold, consecutive or consistent UL LBT failures are detected (on the corresponding BWP, cell, CG, or subset of CG where an LBT counter, an LBT timer, and/or an LBT threshold is maintained and/or configured). Consequently, a recovery procedure (e.g., an LBT recovery procedure) may be initiated by the UE. In one example, the UE may declare a radio link failure (RLF) when the LBT counter reaches the MaxLBT threshold. In one example, the UE may initiate a random access (RA) procedure on the same frequency range as where the consecutive or consistent UL LBT failures are detected. In one example, the UE may initiate an RA procedure on a different frequency range from where the consecutive or consistent UL LBT failures are detected (e.g., via BWP switching). In various implementations of the present disclosure, the same frequency range may be referred to as the same BWP, sub-band, cell, CG, subset of CG, etc.

In one example, a common LBT recovery procedure may be applied for both PCell and SCell(s). In another example, different LBT recovery procedures may be applied on different cells. For example, the UE may declare an RLF if consecutive or consistent UL LBT failures are detected on the PCell, and may initiate an RA procedure on either the same or different frequency range if the consecutive or consistent UL LBT failures are detected on the SCell(s).

Consecutive or consistent UL LBT failures may be detected per BWP, cell, CG, or subset of CG. For example, the set of parameters used for the UL LBT failure mechanism (e.g., LBT counter, LBT timer, MaxLBT, etc.) may be configured and/or maintained per BWP, cell, CG, or subset of CG. Hence, an LBT recovery procedure may be initiated on each of the BWP, cell, CG, or subset of CG.

Handling of Retransmission on a Configured Uplink Grant Resource

As described above, the 3GPP RAN WG2 has agreed to assume that the configured grant timer, which corresponds to the HARQ process ID of a PUSCH resource of a configured uplink grant is not to be (re)started if the transmission is not performed on a PUSCH resource due to an LBT failure. Moreover, the 3GPP RAN WG2 also assumes a pending TB, which has not been transmitted on a configured uplink grant resource due to a LBT failure, may be (re)transmitted in a (subsequent) configured uplink grant resource (with the same HARQ process ID). However, based on the current MAC specification, a configured uplink grant resource of an activated configured uplink grant can only be used for a new transmission (e.g., a UE considers the NDI for the HARQ process ID of this configured uplink grant resource to have been toggled) if the configured grant timer for the corresponding HARQ process is not running/configured. For example, if the HARQ process ID of a configured uplink grant resource is determined to be 1, the configured uplink grant resource is used for new transmission if the configured grant timer with HARQ process ID of 1 is not running/configured. Therefore, new mechanisms are needed to allow retransmission (e.g., a UE considers the NDI for the HARQ process ID of this configured uplink grant resource to not have been toggled) on a configured uplink grant resource even if the configured grant timer for the corresponding HARQ process ID is not running/configured.

Figure 2:
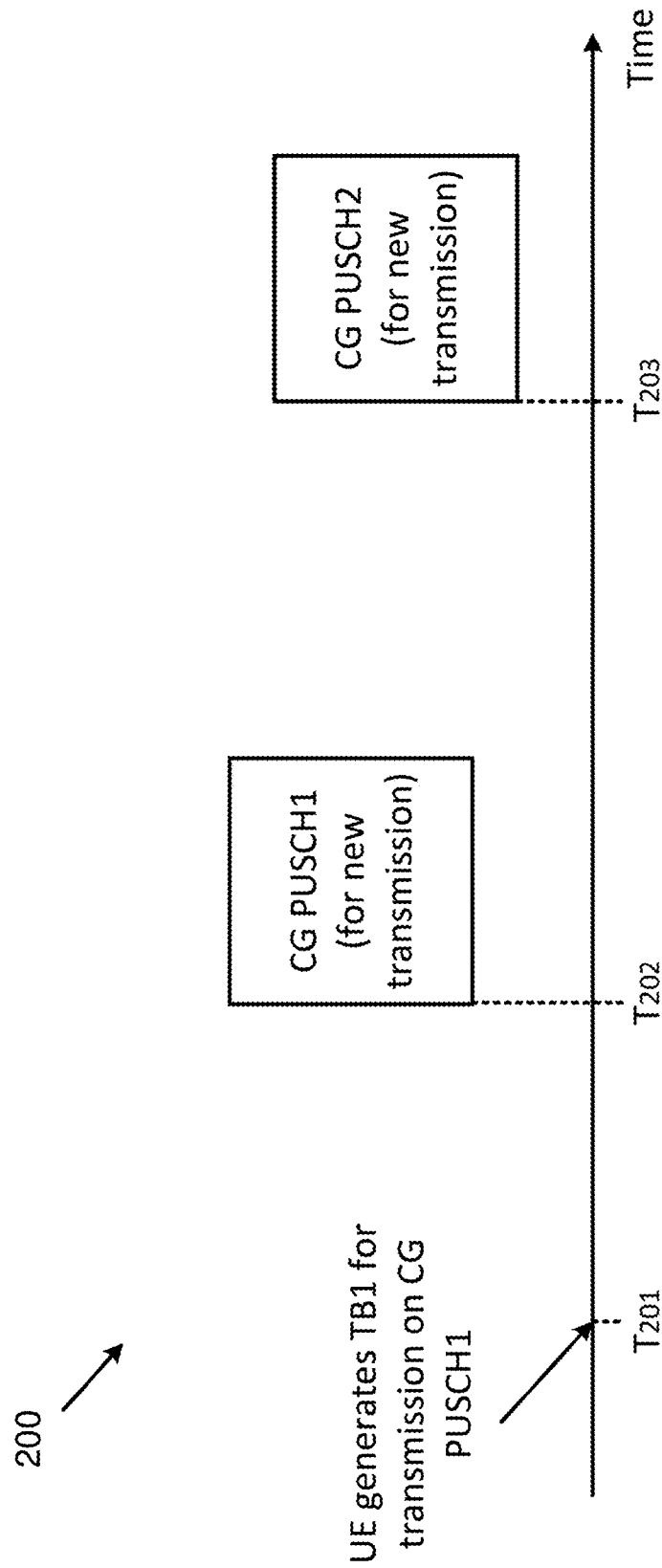
FIG. 2 illustrates a diagram for handling retransmission on a configured uplink grant resource, according to an example implementation of the present disclosure.

FIG. 2 illustrates a diagram for handling retransmission on a configured uplink grant resource, according to various implementations of the present disclosure.

As illustrated in the diagram 200, at time T201, the UE generates a TB1 for transmission on configured uplink grant resource 1 (e.g., CG PUSCH1). At time T202, the UE attempts to transmit the TB1 on the CG PUSCH1, but fails due to an LBT failure or intra-UE prioritization (e.g., CG PUSCH1 is deprioritized as a result of intra-UE prioritization), for example. At time T203, another configured uplink grant resource (CG PUSCH2) is available. It should be noted that the CG PUSCH2 is intended for a new transmission of another TB. That is, the UE generates a new TB for transmission on the CG PUSCH2. Note that a configured uplink grant resource may be referred to as an UL resource (e.g., PUSCH) that corresponds/associates to a configured grant configuration in the present disclosure.

Implementations of the present disclosure describe various methods to determine whether the CG PUSCH2 can be used to for the transmission of the TB1. For example, the various methods may allow the UE to transmit the TB1, which has not been transmitted due to an LBT failure or due to being deprioritized as a result of intra-UE prioritization, on the CG PUSCH2, while the configured grant timer corresponding to the HARQ process ID of CG PUSCH2 is not running/configured. As discussed below, the methods that can be used to determine whether the CG PUSCH2 can be used for the transmission of TB1 may be at least one of: condition-based, timer-based, state variable-based, and counter-based.

Condition-Based Handling of Retransmission on a Configured Uplink Grant Resource In various implementations of the present disclosure, new conditions are introduced to conditionally allow retransmissions (e.g., a UE considers the NDI to not have been toggled) on a configured uplink grant resource even if the configured grant timer, which corresponds to the HARQ process of the configured uplink grant resource is not running/configured. Here, retransmission may be referred to as transmitting a MAC PDU/TB that has already been generated/obtained.

As such, a TB which has not been transmitted on a configured uplink grant resource due to specific reasons (e.g., an LBT failure) may be (re)transmitted this configured uplink grant resource (of same or different configured grant configuration).

Figure 3:
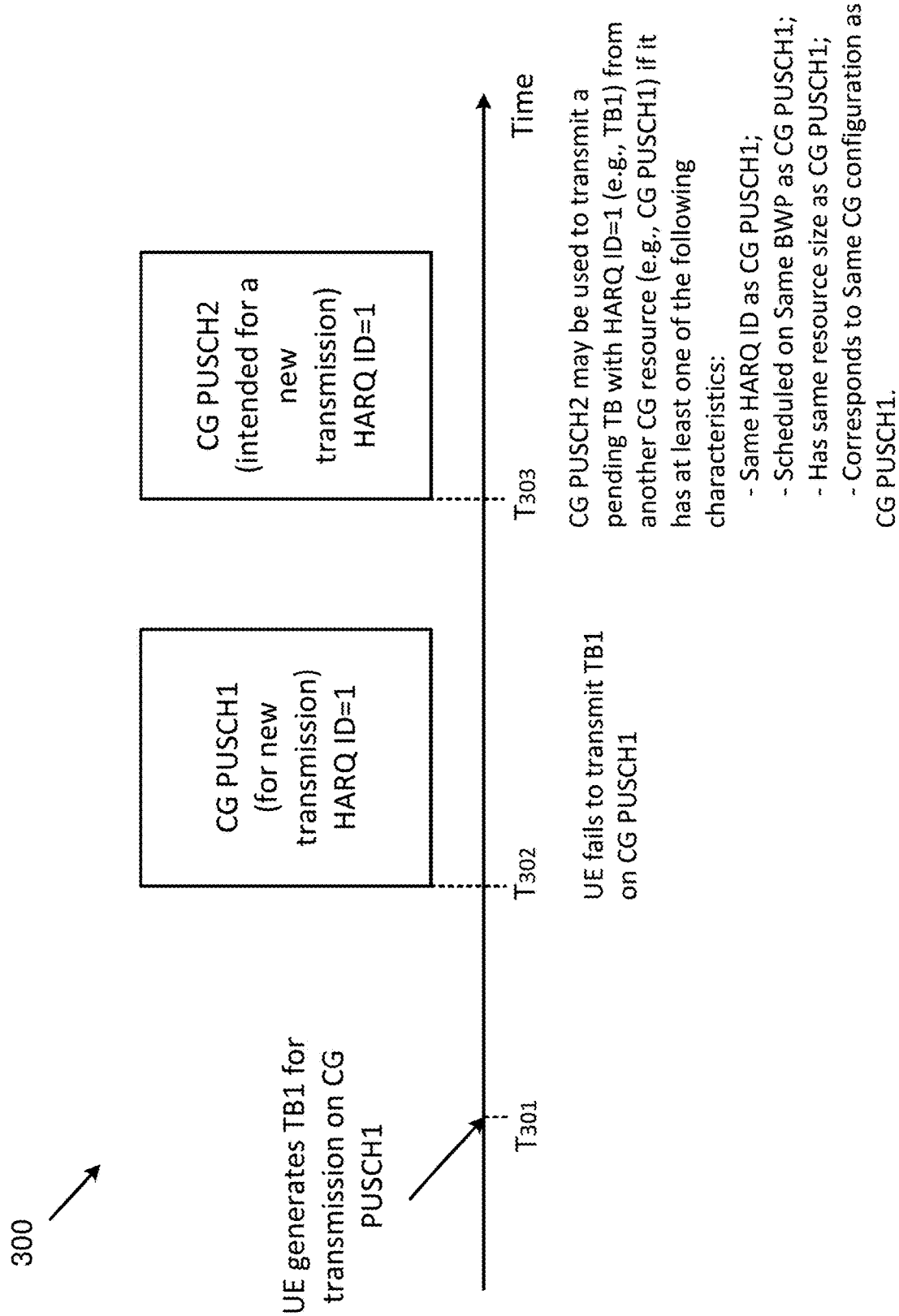
FIG. 3 illustrates a diagram for condition-based handling of retransmission on a configured uplink grant resource, according to an example implementation of the present disclosure.

FIG. 3 illustrates a diagram for condition-based handling of retransmission on a configured uplink grant resource (e.g., a PUSCH that corresponds to a configured grant configuration), according to an example implementation of the present disclosure. As illustrated in the diagram 300, at time T301, the UE generates a TB1 for transmission on configured uplink grant resource 1 (e.g., CG PUSCH1). At time T302, the UE attempts to transmit the TB1 on the CG PUSCH1, but fails due to an LBT failure or intra-UE prioritization (e.g., CG PUSCH1 is deprioritized as a result of intra-UE prioritization), for example. At time T303, the UE may perform (re)transmission of the TB1 on configured uplink grant resource 2 (e.g., CG PUSCH2), if it has at least one of the following characteristics:

- If the configured grant timer for the HARQ process ID of configured uplink grant resource 2 (e.g., CGPUSCH2) is not running/configured, i.e., CGPUSCH2 is for new transmission.
- If the configured grant timer for the HARQ process ID of configured uplink grant resource 2 (e.g., CG PUSCH2) is running, i.e., CG PUSCH2 is for retransmission.
- If configured uplink grant resource 2 (e.g., CG PUSCH2) does not overlap with other UL resources in the time domain.
- If configured uplink grant resource 2 (e.g., CG PUSCH2) is prioritized over other UL resources that it overlaps with in the time domain, as a result of intra-UE prioritization.
- If configured uplink grant resource 1 (e.g., CG PUSCH1) corresponds to the same HARQ process ID as configured uplink grant resource 2 (e.g., CG PUSCH2).
- If the configured uplink grant resource 1 (e.g., CG PUSCH1) and configured uplink grant resource 2 (e.g., CG PUSCH2) belong to the same frequency range, (e.g., scheduled/configured on the same BWP, cell, CG, or subset of CG). It is noted that under this condition, configured uplink grant resource 2 (e.g., CG PUSCH2) and configured uplink grant resource 1 (e.g., CG PUSCH1) may belong to different configured grant configurations.
- If there is a TB in the HARQ buffer, which corresponds to the HARQ process ID of the configured uplink grant resource 1 (e.g., CG PUSCH1).
- If the size of configured uplink grant resource 1 (e.g., CG PUSCH1) matches the size of configured uplink grant resource 2 (e.g., CG PUSCH2).
- If the configured uplink grant resource 1 (e.g., CG PUSCH1) corresponds to different HARQ process ID as configured uplink grant resource 2 (e.g., CG PUSCH2) and the HARQ buffer which corresponds to configured uplink grant resource 2 (e.g., CG PUSCH2) does not contain a TB.
- If configured uplink grant resource 2 (e.g., CG PUSCH2) is the first (or the next) configured uplink grant resource that occur after configured uplink grant resource 1 (e.g., CG PUSCH1).
- If configured uplink grant resource 2 (e.g., CG PUSCH2) is the first (or the next) configured uplink grant resource that occur after the backoff time interval upon LBT failure corresponding to the configured uplink grant resource 1 (e.g., CG PUSCH1).
- If the configured uplink grant resource 2 (e.g., CG PUSCH2) is configured by the configured grant configuration 2, which is the next configuration the UE receives after the configured grant configuration 1, which configures the configured uplink grant resource 1 (e.g., CG PUSCH1).
- If the configured uplink grant resource 2 (e.g., CG PUSCH2) and configured uplink grant resource 1 (e.g., CG PUSCH1) belong to the same configured grant configuration. More specifically, this condition may work under the assumption that a UE may flush the HARQ buffer corresponding to a HARQ process ID (e.g., HARQ ID=i), when ACK is received from the network for this HARQ process ID (e.g., HARQ ID=i), and/or upon expiry of a configured grant timer with this HARQ process ID (e.g., HARQ ID=i).
- If the size of the TB in the HARQ buffer, which corresponds to the HARQ process ID of the configured uplink grant resource 1 (e.g., CG PUSCH1), is smaller than the size of the configured uplink grant resource 2 (e.g., CG PUSCH2).
- If configured uplink grant resource 1 (e.g., CG PUSCH1) and configured uplink grant resource 2 (e.g., CG PUSCH2) belong to two configured grant configurations, and some specific parameters configured for these two configured grant configurations are the same. Here, specific parameters may be repK, periodicity, MCS-table, repK-RV, etc.
- If the configured grant configuration that configured uplink grant resource 1 (e.g., CG PUSCH1) belongs to is configured with repetition number of 1, e.g., repK [3] configured in this configured grant configuration is 1.
- If the UE does not receive a dynamic grant for retransmission for configured uplink grant resource 1 (e.g., CG PUSCH1) from the network within a specific period after the configured uplink grant resource 1. Such a specific period may be configured by the network via specific signaling (e.g., configured via RRC/DCI/MAC CE).
- If the LBT counter (configured on the frequency range where configured uplink grant resource 1 (e.g., CG PUSCH1) belongs to) has not reached MaxLBT (configured on the frequency range where configured uplink grant resource 1 belongs to). The frequency range may be referred to a BWP, cell, CG, or subset of CG.
- If the configured grant configuration, which configured uplink grant resource 1 belongs to is not cleared/deactivated/reconfigured/suspended.
- If the transmission-failure-reattempt state variable (corresponding to the HARQ process of the configured uplink grant resource 1 (e.g., CG PUSCH1)) (as described below) is set to FALSE.
- If the transmission-failure timer (corresponding to the HARQ process of the configured uplink grant resource 1) (as described below) is still running.
- If the transmission_attempt_counter (corresponding to the HARQ process of the configured uplink grant resource 1 (e.g., CG PUSCH1)) (as described below) has not reached maximum-transmission-attempt (as described below).

It is noted that the CG PUSCH1 and CG PUSCH2 may be belong to/associated with/configured by a same or single configured grant configuration. It is noted that the CG PUSCH1 and CG PUSCH2 may belong to different bundles of the same configured grant configuration. It is noted that if a parameter repK is configured to a configured grant configuration, a bundle may include a number of configured uplink grant resources, and the number may be defined by repK. Moreover, after the new transmission, repK−1 HARQ retransmissions (repetitions) follow within the bundle.

In one aspect, the CG PUSCH1 may belong to a configured grant Type 1 configuration (in which retransmissions on the corresponding configured uplink grant resources are allowed), configured grant Type 2 configuration (in which retransmissions on the corresponding configured uplink grant resources are allowed), etc.

In one aspect, the CG PUSCH2 may belong to a configured grant Type 1 (in which retransmissions on the corresponding configured uplink grant resources are allowed), configured grant Type 2 (in which retransmissions on the corresponding configured uplink grant resources are allowed), etc.

In one example, multiple configured grant configurations may be activated on the same BWP. Therefore, if the UE fails to perform transmission on the CG PUSCH1 (e.g., due to LBT failure or due to CG PUSCH1 being deprioritized as a result of intra-UE prioritization), the UE may perform (re)transmission on the CG PUSCH2, even if the CG PUSCH1 and the CG PUSCH2 belong to different configured grant configurations, as long as they belong to the same BWP (and the same HARQ process ID). In this implementation, it is assumed that the configured grant timer for the HARQ process ID of the CG PUSCH2 is not running/configured and the CG PUSCH2 does not overlap with other UL resources in the time domain.

In one example, if the UE fails to perform transmission of TB1 on the CG PUSCH1 (e.g., due to LBT failure or due to CG PUSCH1 being deprioritized as a result of intra-UE prioritization), the UE may perform (re)transmission on the CG PUSCH2, only if the CG PUSCH1 is not configured with repetitions (repK [3] configured in the configured grant configuration that configured uplink grant resource 1 belongs to is 1). That is, if the CG PUSCH1 is configured with repK>1, the LBT may be successful on the repetition resource of configured uplink grant resource 1. Hence, there is no need to rely on the CG PUSCH2 for retransmission. In this implementation, it is assumed that the configured grant timer for the HARQ process ID of the CG PUSCH2 is not running/configured and the CG PUSCH2 does not overlap with other UL resources in the time domain.

In one example, the UE may detect an LBT failure, which concludes that transmission on the CG PUSCH1, is not allowed. However, the TB1 corresponding to the CG PUSCH1 may not have been generated when the LBT failure is detected. Hence, the UE may perform (re)transmission on another configured uplink grant resource (e.g., CG PUSCH2), only if the TB (e.g., TB1) corresponding to the CG PUSCH1 has been generated, e.g., the HARQ buffer corresponding to the CG PUSCH1 is not empty. Alternatively, the UE may always complete/perform the generation of a TB (e.g., TB1) even if transmission of this TB (e.g., TB1) cannot be performed due to an LBT failure, which may be detected before or while the UE is generating the TB (e.g., TB1). In another example, the UE may perform LBT after the TB (e.g., TB1) corresponding to the UL transmission is completely generated. Specifically, this example may work under the assumption that the UE may flush the HARQ buffer corresponding to a HARQ process ID of i when ACK is received from the network for HARQ process ID of i and/or upon expiry of configured grant timer with HARQ process ID of i.

In one example, if the UE fails to perform transmission of a TB (e.g., TB1) on the CG PUSCH1 (e.g., due to an LBT failure or due to CG PUSCH1 being deprioritized as a result of intra-UE prioritization), the UE may attempt to perform a (re)transmission of the TB (TB1 included in the HARQ buffer) on the CG PUSCH2, when the CG PUSCH2 may be the same HARQ process ID as the CG PUSCH1. Hence, if the TB (e.g., TB1) has been generated (and is not transmitted due to an LBT failure), the UE may not use the same HARQ process ID as this TB to perform a new transmission (e.g., a dynamic uplink grant scheduled by the gNB) until the TB (e.g., TB1) is (re)transmitted (e.g., via the CG PUSCH2).

In one example, if a UE fails to perform transmission of a TB (e.g., TB1) on the CG PUSCH1 (e.g., due to an LBT failure or due to CG PUSCH1 being deprioritized as a result of intra-UE prioritization), the UE may perform (re)transmission of the TB (e.g., TB1) on the CG PUSCH2, only if the CG PUSCH2 is for new transmission (e.g., the configured grant timer that corresponds to the HARQ process ID of CG PUSCH2 is not running/configured) with the same the HARQ process ID as CG PUSCH1, and both CG PUSCH1 and CG PUSCH2 are configured in the same (UL) BWP.

For example, the UE may ignore any (dynamic) scheduling for new transmission (or retransmission) with the same HARQ process ID as the TB until this TB is (re)transmitted (e.g., via the CG PUSCH2). In another example, before the TB is (re)transmitted (e.g., via the CG PUSCH2), the UE may consider the NDI of any (dynamic) scheduling for new transmission (or retransmission), which has the same HARQ process ID as the TB, to not have been toggled regardless of the value of the NDI.

In one example, if a UE fails to perform transmission of a TB (e.g., TB1) on CG PUSCH1 (e.g., due to CG PUSCH1 being deprioritized as a result of intra-UE prioritization or due to LBT failure), the UE may perform (re)transmission of the TB (e.g., TB1) on CG PUSCH2 if CG PUSCH2 has at least one of the characteristics as defined above. In this example, CG PUSCH2 may be used for a new transmission (e.g., the configured grant timer for the HARQ process ID of the CG PUSCH2 is not running/configured). Hence, if the TB (e.g., TB1) cannot be (re)transmitted on CG PUSCH2, a new MAC PDU/TB may be generated for transmission on CG PUSCH2.

Timer-Based Handling of Retransmission on a Configured Uplink Grant Resource

In various implementations of the present disclosure, a timer (e.g., a transmission-failure timer) may be configured by a network to a UE. This timer may be maintained per HARQ process. The transmission-failure timer defines a period when retransmission (e.g., consider the NDI to not have been toggled) of a TB (which was not transmitted due to an LBT failure) corresponding to the HARQ process of the timer is allowed on a configured uplink grant resource even if this configured uplink grant resource is determined to be used for new transmission, per current MAC specification (e.g., the configured grant timer, which corresponds to the HARQ process of the configured uplink grant resource is not running/configured).

In one example, if the transmission-failure timer for a HARQ process A is running, the UE may use a configured uplink grant resource for retransmission (e.g., consider the NDI to not have been toggled) of a TB (which was not transmitted due to an LBT failure) that corresponds to the HARQ process A (e.g., the TB is stored in the HARQ buffer which corresponds to the HARQ process A). On the other hand, if the transmission-failure timer for the HARQ process A is either not configured or not running, the UE may only use a configured uplink grant resource for a new transmission. For example, the UE may not use the configured uplink grant resource with the HARQ process A for the retransmission of the TB that was not transmitted due to the LBT failure, if the configured grant timer with HARQ process A is not running/configured.

In one example, if the transmission-failure timer for HARQ process A is running, the UE may not use the HARQ process A for any new transmission (e.g., consider the NDI to have been toggled). The UE may ignore the dynamic grant for new transmission using the HARQ process A when the transmission-failure timer for HARQ process A is running. In another example, while the transmission-failure timer for HARQ process A is running, the UE may consider the NDI of any (dynamic) scheduling for a new transmission (or retransmission) with HARQ process A to not have been toggled regardless of the value of the NDI.

In some implementations of the present disclosure, the transmission-failure timer may be configured per BWP, cell, CG, or subset of CG. In some implementations of the present disclosure, the transmission-failure timer may be configured via RRC signaling (e.g., included in ConfiguredGrantConfig IE). In some implementations of the present disclosure, the transmission-failure timer may be configured in units of symbol/slot/millisecond/multiples of configured uplink grant periodicity.

Figure 4:
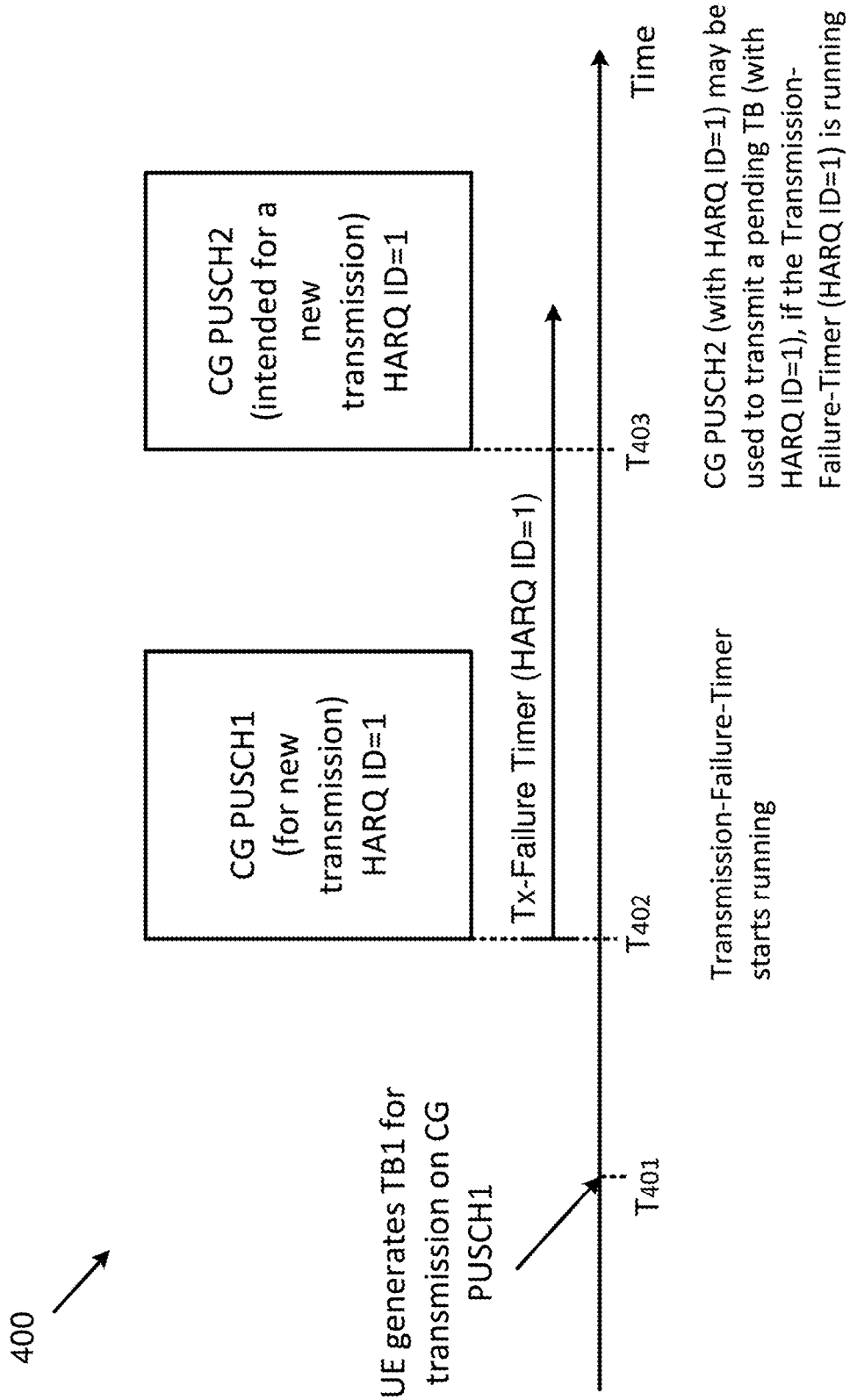
FIG. 4 illustrates a diagram for timer-based handling of retransmission on a configured uplink grant resource, according to an example implementation of the present disclosure.

FIG. 4 illustrates a diagram for timer-based handling of retransmission on a configured uplink grant resource, according to an example implementation of the present disclosure. As illustrated in the diagram 400, at time T401, the UE generates a TB1 for transmission on configured grant (CG) PUSCH1. At time T402, the transmission-failure timer starts, as the UE attempts but fails to transmit the TB1 on the CG PUSCH1 due to an LBT failure or intra-UE prioritization (e.g., the CG PUSCH1 is deprioritized as a result of intra-UE prioritization), for example. At time 403, while the transmission-failure timer is running, the UE may perform (re)transmission of the TB1 on a configured uplink grant resource (e.g., CG PUSCH2), if the CG PUSCH1 and the CG PUSCH2 both have the same HARQ ID (e.g., HARQ ID=1).

In various implementations of the present disclosure, the transmission-failure timer (which corresponds to a specific HARQ process ID) may be (re)started when one or multiple of the following conditions are satisfied:

When a configured uplink grant resource (which corresponds to the HARQ process ID of the transmission-failure-timer) is configured and activated (and the configured grant configuration that this configured uplink grant resource belongs to can be used for retransmission), and the configured grant timer corresponds to the HARQ process of the configured uplink grant resource is not running/configured.

When a TB (which corresponds to the HARQ process ID of the transmission-failure timer) is not transmitted on an UL resource due to an LBT failure.

When a TB (which corresponds to the HARQ process ID of the transmission-failure timer) is not transmitted on an UL resource due to intra-UE prioritization (e.g., the UL resource is deprioritized as a result of intra-UE prioritization).

When a TB (which corresponds to the HARQ process ID of the transmission-failure timer) is not transmitted on an UL resource due to an LBT failure, and the LBT counter (configured on the same frequency range as the TB) has not reached MaxLBT (configured on the same frequency range as the TB). The frequency range may be referred to a BWP, cell, CG, or subset of CG.

When a TB (which corresponds to the HARQ process ID of the transmission-failure timer) is not transmitted on an UL resource due to intra-UE prioritization (e.g., the UL resource is deprioritized as a result of intra-UE prioritization), and the LBT counter (configured on the same frequency range as the TB) has not reached MaxLBT (configured on the same frequency range as the TB). The frequency range may be referred to a BWP, cell, CG, or subset of CG.

When a (new) transmission of a HARQ process is not transmitted successfully on a configured grant due to an LBT failure.

When a configured grant timer is started or restarted, wherein the configured gran timer may be associated with the same HARQ process as the transmission-failure timer. Specifically, the UL resource may be configured by the gNB via RRC. For example, configured grant Type 1 configuration (in which retransmissions on the corresponding configured uplink grant resources are allowed), configured grant Type 2 configuration (in which retransmissions on the corresponding configured uplink grant resources are allowed). In another example, the UL resource may be scheduled by the gNB via DCI.

In various implementations of the present disclosure, the transmission-failure timer (which corresponds to a specific HARQ process ID) may be stopped when one or multiple of the following conditions are satisfied:

When the TB that starts this transmission-failure timer has been (re)transmitted on a configured uplink grant resource (which corresponds to the same HARQ process ID as the transmission-failure timer).

For example, the configured uplink grant resource may belong to a configured grant Type 1 configuration (in which retransmissions on the corresponding configured uplink grant resources are allowed), configured grant Type 2 configuration (in which retransmissions on the corresponding configured uplink grant resources are allowed), etc.

When the TB that starts this transmission-failure timer has been (re)transmitted on a UL resource, which is scheduled by the network for dynamic retransmission (which corresponds to the same HARQ process ID as the transmission-failure timer).

When a retransmission of a HARQ process is transmitted successfully on a configured grant, wherein the transmission-failure timer is associated with the HARQ process.

When the serving cell which corresponds to the TB that starts this transmission-failure timer has been deactivated.

Upon MAC reset/reconfiguration.

The BWP (which corresponds to the TB that starts this transmission-failure timer) is deactivated.

BWP switching is performed.

BFR is detected on the serving cell (which corresponds to the TB that starts this transmission-failure timer).

If the LBT counter (configured on the same frequency range as the TB that starts this transmission-failure timer) has reached MaxLBT (configured on the same frequency range as the TB that starts this transmission-failure timer). The frequency range may be referred to a BWP, cell, CG, or subset of CG.

If an RA procedure, which is initiated by a UE due to consistent UL LBT failures (e.g., LBT counter is equal to or larger than MaxLBT), has been initiated.

If an RA procedure, which is initiated by a UE due to consistent UL LBT failures (e.g., LBT counter is equal to or larger than MaxLBT), has been completed.

If the configured grant configuration which corresponds to the TB that starts this transmission-failure timer has been deactivated/cleared.

If the HARQ buffer which corresponds to the TB that starts this transmission-failure timer has been flushed/overwritten by another TB.

If the configured grant corresponding to the transmission-failure timer is (re-)activated, deactivated and/or released. For example, the transmission-failure timer is (re)started when a failed transmission happens on the configured grant due to an LBT failure.

State Variable-Based Handling of Retransmission on a Configured Uplink Grant Resource In various implementations of the present disclosure, a new state variable (e.g., transmission-failure-reattempt) may be maintained per HARQ process. This state variable may indicate either a FALSE or a TRUE state. When transmission-failure-reattempt is set to FALSE, retransmission of a TB (which was not transmitted due to an LBT failure) corresponding to the HARQ process of transmission-failure-reattempt is allowed on a configured uplink grant resource even if this configured uplink grant resource is determined to be used for a new transmission, per current MAC specification (e.g., the configured grant timer, which corresponds to the HARQ process of the configured uplink grant resource is not running/configured).

For example, if transmission-failure-reattempt for HARQ process A is set to FALSE, the UE may use a configured uplink grant resource with HARQ process A for retransmission of a TB (which was not transmitted due to an LBT failure) when the configured grant timer with HARQ process A is not running/configured. On the other hand, if the transmission-failure-reattempt for HARQ process A is set to TRUE, the UE may only use a configured uplink grant resource with HARQ process A for new transmission (e.g., consider the NDI to have been toggled) if the configured grant timer with HARQ process A is not running/configured.

In one example, if the transmission-failure-reattempt for HARQ process A is set to FALSE, the UE may not use the HARQ process A for any new transmission. The UE may ignore the dynamic grant for new transmission using HARQ process A when the transmission-failure-reattempt for HARQ process A is set to FALSE. In another example, while the transmission-failure-reattempt for HARQ process A is set to FALSE, the UE may consider the NDI of any (dynamic) scheduling for a new transmission (or retransmission) with HARQ process A to not have been toggled regardless of the value of the NDI.

Figure 5:
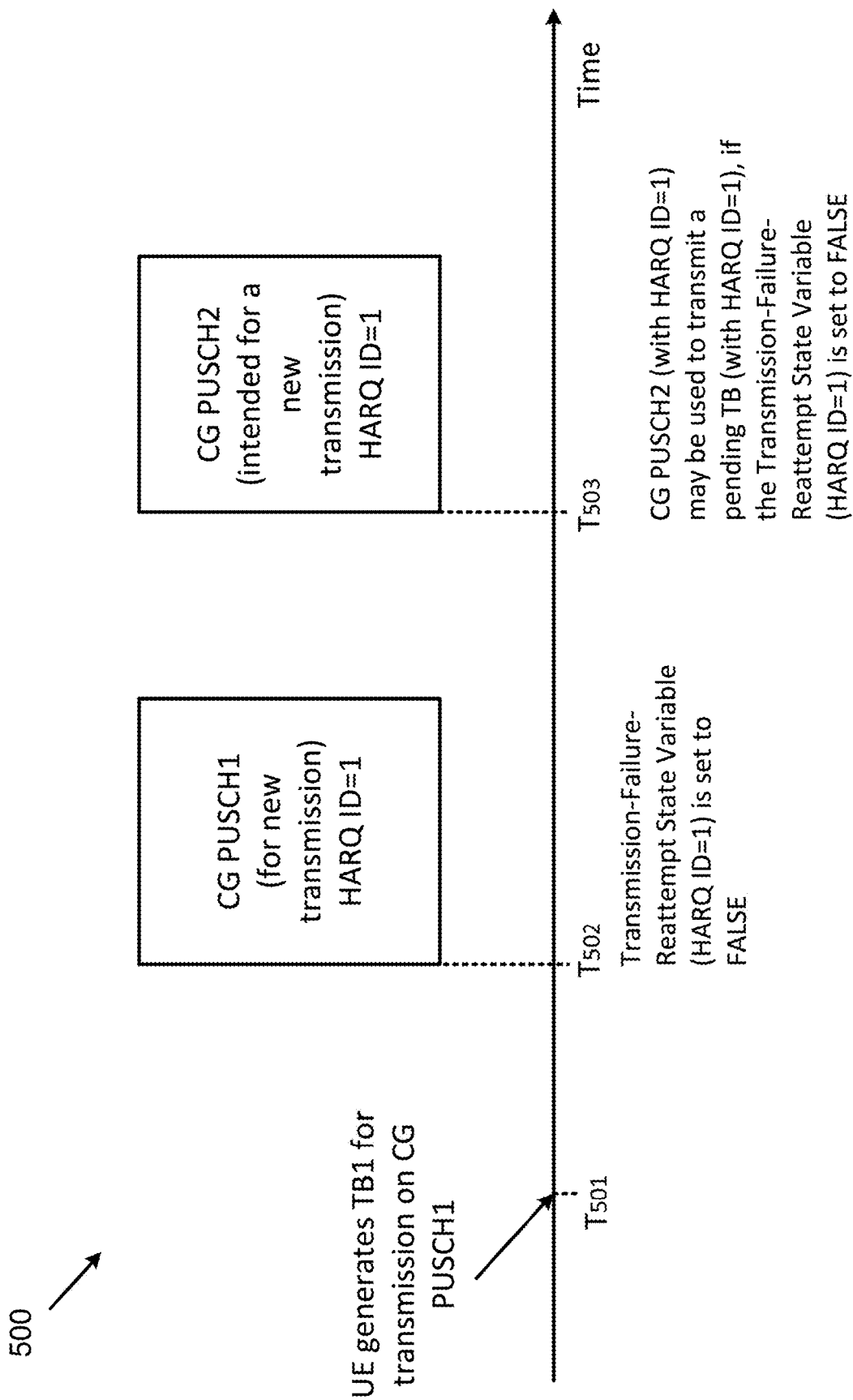
FIG. 5 illustrates a diagram for state variable-based handling of retransmission on a configured uplink grant resource, according to an example implementation of the present disclosure.

FIG. 5 illustrates a diagram for state variable-based handling of retransmission on a configured uplink grant resource, according to an example implementation of the present disclosure. As illustrated in the diagram 500, at time T501, the UE generates a TB1 for transmission on configured grant (CG) PUSCH1. At time T502, the UE attempts but fails to transmit the TB1 on the CG PUSCH1 due to an LBT failure or intra-UE prioritization (e.g., the CG PUSCH1 is deprioritized as a result of intra-UE prioritization), for example. The transmission-failure-reattempt stable variable, having a HARQ ID=1, is set to FALSE. At time T503, when the transmission-failure-reattempt stable variable, having a HARQ ID=1, is set to FALSE, the UE may perform (re) transmission of the TB1 on a configured uplink grant resource (e.g., CG PUSCH2), if the CG PUSCH1 and the CG PUSCH2 both have the same HARQ ID (e.g., HARQ ID=1).

In various implementations of the present disclosure, the transmission-failure-reattempt state variable (which corresponds to a specific HARQ process ID) may be set to FALSE by the UE if one or multiple of the following conditions are satisfied:

When a configured uplink grant resource (which corresponds to the HARQ process ID of the transmission-failure-reattempt) is configured and/or activated (and the configured grant configuration that this configured uplink grant resource belongs to can be used for retransmission), and the configured grant timer corresponds to the HARQ process of the configured uplink grant resource is not running/configured.

When a TB (which corresponds to the HARQ process ID of the transmission-failure-reattempt state variable) is not transmitted on an UL resource due to an LBT failure.

When a TB (which corresponds to the HARQ process ID of the transmission-failure-reattempt state variable) is not transmitted on an UL resource due to intra-UE prioritization (e.g., the UL resource is deprioritized as a result of intra-UE prioritization).

When a TB (which corresponds to the HARQ process ID of the transmission-failure-reattempt state variable) is not transmitted on an UL resource due to an LBT failure, and the LBT counter (configured on the same serving cell where the transmission-failure-reattempt is maintained) has not reached MaxLBT (configured on the same serving cell where the transmission-failure-reattempt is maintained).

When a TB (which corresponds to the HARQ process ID of the transmission-failure-reattempt state variable) is not transmitted on an UL resource due to intra-UE prioritization (e.g., the UL resource is deprioritized as a result of intra-UE prioritization), and the LBT counter (configured on the same serving cell where the transmission-failure-reattempt is maintained) has not reached MaxLBT (configured on the same serving cell where the transmission-failure-reattempt is maintained).

Upon MAC reset/reconfiguration.

When the serving cell where the transmission-failure-reattempt is maintained has been deactivated.

When a (new) transmission of a HARQ process is not transmitted successfully on a configured grant due to an LBT failure.

Specifically, the UL resource may be configured by the gNB via RRC. For example, configured grant Type 1 configuration (in which retransmissions on the corresponding configured uplink grant resources are allowed), configured grant Type 2 configuration (in which retransmissions on the corresponding configured uplink grant resources are allowed).

Specifically, the UL resource may be scheduled by the gNB via DCI.

In various implementations of the present disclosure, the transmission-failure-reattempt state variable (which corresponds to a specific HARQ process ID) may be set to TRUE by the UE when one or multiple of the following conditions are satisfied:

When the TB has been (re)transmitted on a configured uplink grant resource (which corresponds to the same HARQ process ID as the transmission-failure-reattempt). More specifically, the configured uplink grant resource may belong to a configured grant Type 1 configuration (in which retransmissions on the corresponding configured uplink grant resources are allowed), configured grant Type 2 configuration (in which retransmissions on the corresponding configured uplink grant resources are allowed), etc.

When the TB has been retransmitted on a UL resource scheduled by the network for dynamic transmission (which corresponds to the same HARQ process ID as the transmission-failure-reattempt).

Upon MAC reset/reconfiguration.

When the serving cell where the transmission-failure-reattempt is maintained has been deactivated.

If the LBT counter (configured on the same serving cell where the transmission-failure-reattempt is maintained) has reached MaxLBT (configured on the same serving cell where the transmission-failure-reattempt is maintained).

If an RA procedure, which is initiated by a UE due to consistent UL LBT failures (e.g., LBT counter is equal to or larger than MaxLBT), has been initiated.

If an RA procedure, which is initiated by a UE due to consistent UL LBT failures (e.g., LBT counter is equal to or larger than MaxLBT), has been completed.

If the HARQ buffer which corresponds to the TB that starts this transmission-failure timer has been flushed/overwritten by another TB.

When the serving cell where the transmission-failure-reattempt is maintained has been deactivated.

If the configured grant corresponding to the transmission-failure timer is (re-)activated, deactivated and/or released. For example, the transmission-failure-reattempt is set to FALSE when a failed transmission happens on the configured grant due to an LBT failure.

Counter-Based Handling of Retransmission on a Configured Uplink Grant Resource

In various implementations of the present disclosure, a new counter (e.g., transmission_attempt_counter) may be maintained per HARQ process. This counter may be used to count the number of UL transmission attempts for a HARQ process. The transmission_attempt_counter may be incremented if a UE fails to transmit on a (configured grant) UL resource, which corresponds to the HARQ process ID of the transmission_attempt_counter.

A new threshold (e.g., maximum-transmission-attempt) may be configured by a network. This threshold may be defined as the maximum number of (configured grant) UL transmission attempts that may be performed by the UE. If a transmission_attempt_counter is smaller than the configured maximum-transmission-attempt, retransmission of a TB (which was not transmitted due to an LBT failure) is allowed on a configured uplink grant resource with the same HARQ process ID as the transmission_attempt_counter even if this configured uplink grant resource is determined to be used for a new transmission, per current MAC specification (e.g., the configured grant timer, which corresponds to the HARQ process of the configured uplink grant resource is not running/configured). In contrast, if the value of transmission_attempt_counter reaches maximum-transmission-attempt (e.g., transmission_attempt_counter is equal to or larger than maximum-transmission-attempt), a retransmission of a TB (which was not transmitted due to an LBT failure) on a configured uplink grant resource with the same HARQ process ID as the transmission_attempt_counter is not allowed if this configured uplink grant resource is determined to be used for a new transmission, per current MAC specification (e.g., the configured grant timer, which corresponds to the HARQ process of the configured uplink grant resource is not running/configured).

For example, if transmission_attempt_counter for HARQ process A has not reached maximum-transmission-attempt, the UE may use a configured uplink grant resource with a HARQ process A for retransmission of a TB (which was not transmitted due to an LBT failure). In another example, if the transmission-failure-reattempt for the HARQ process A has reached the maximum-transmission-attempt, the UE may only use a configured uplink grant resource with HARQ process A for a new transmission. Moreover, the UE may only use a configured uplink grant resource with HARQ process A for a new transmission only if the configured grant timer for the HARQ process A is not running.

In one example, if the transmission_attempt_counter for HARQ process A has not reached maximum-transmission-attempt, the UE may not use the HARQ process A for any new transmission. The UE may ignore the dynamic grant for new transmission using the HARQ process A while the transmission_attempt_counter for HARQ process A has not reached the maximum-transmission-attempt. In another example, while the transmission_attempt_counter for HARQ process A has not reached the maximum-transmission-attempt, the UE may consider the NDI of any (dynamic) scheduling for new transmission (or retransmission) with HARQ process A to not have been toggled regardless of the value of the NDI.

In some implementations of the present disclosure, the transmission_attempt_counter may be configured per BWP, cell, CG, or subset of CG.

In some implementations of the present disclosure, the transmission_attempt_counter may be configured via RRC signaling, e.g., included in ConfiguredGrantConfig IE.

In some implementations of the present disclosure, the maximum-transmission-attempt may be configured per BWP, cell, CG, or subset of CG.

In some implementations of the present disclosure, the maximum-transmission-attempt may be configured via RRC signaling, e.g., included in ConfiguredGrantConfig IE.

Figure 6:
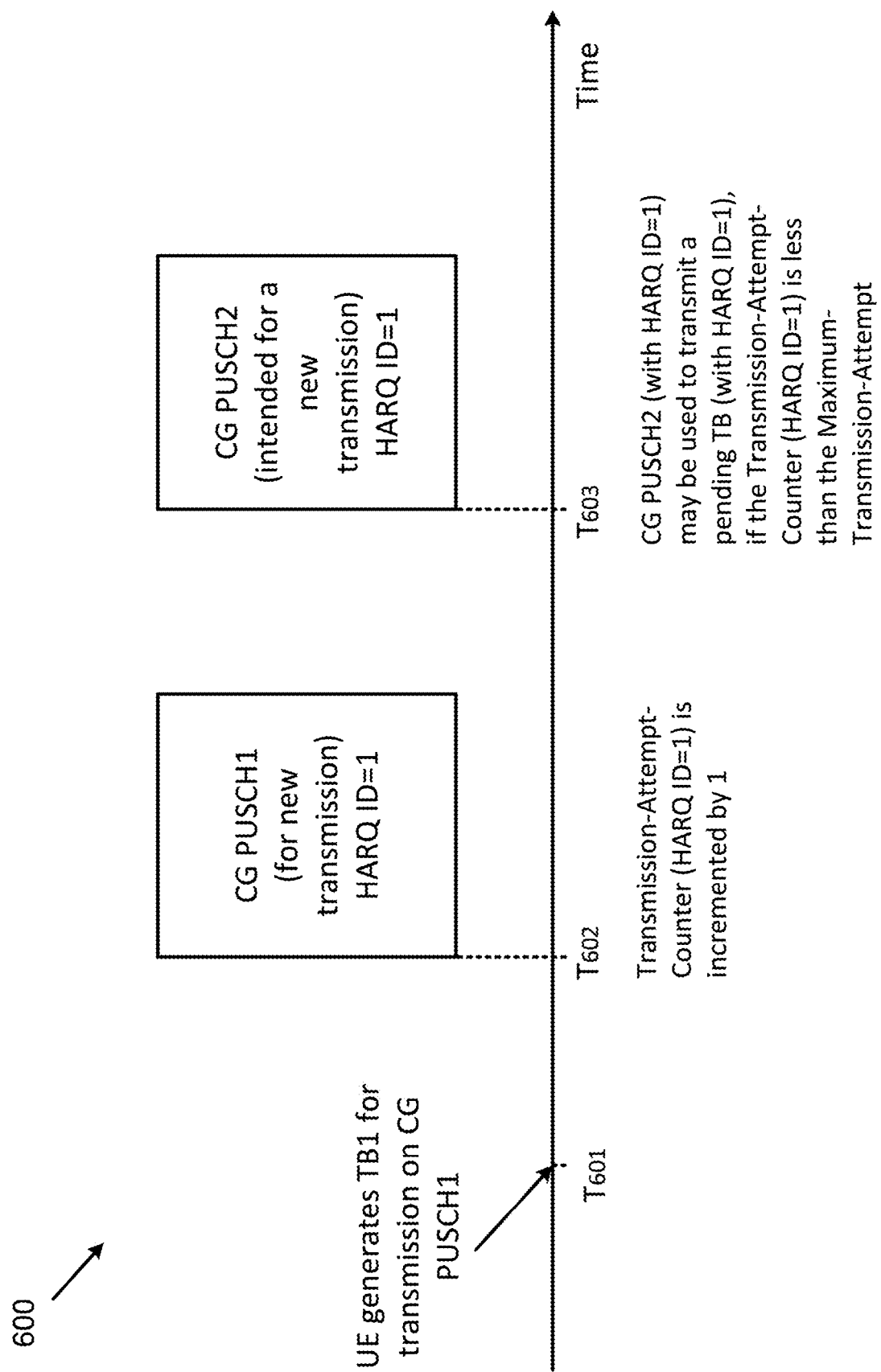
FIG. 6 illustrates a diagram for counter-based handling of retransmission on a configured uplink grant resource, according to an example implementation of the present disclosure.

FIG. 6 illustrates a diagram for counter-based handling of retransmission on a configured uplink grant resource, according to an example implementation of the present disclosure. As illustrated in the diagram 600, at time T601, the UE generates a TB1 for transmission on configured grant (CG) PUSCH1. At time T602, the transmission-attempt counter is incremented by 1, as the UE attempts but fails to transmit the TB1 on the CG PUSCH1 due to an LBT failure or due to CG PUSCH1 being deprioritized as a result of intra-UE prioritization, for example. At time T603, while the transmission-attempt counter is less than the maximum-transmission-attempt, the UE may perform (re)transmission of the TB1 on a configured uplink grant resource (e.g., CG PUSCH2), if the CG PUSCH1 and the CG PUSCH2 both have the same HARQ ID (e.g., HARQ ID=1).

In various implementations of the present disclosure, the transmission_attempt_counter (which corresponds to a specific HARQ process ID) may be incremented (by 1) if one or multiple of the following conditions are satisfied:

When a configured uplink grant resource (which corresponds to the HARQ process ID of the transmission_attempt_counter) is configured and activated (and the configured grant configuration that this configured uplink grant resource belongs to can be used for retransmission), and the configured grant timer corresponds to the HARQ process of the configured uplink grant resource is not running/configured.

When a TB (which corresponds to the HARQ process ID of the transmission_attempt_counter) is not transmitted on an UL resource due to an LBT failure.

When a TB (which corresponds to the HARQ process ID of the transmission_attempt_counter) is not transmitted on an UL resource due to the UL resource being deprioritized as a result of intra-UE prioritization.

When a TB (which corresponds to the HARQ process ID of the transmission_attempt_counter) is not transmitted on an UL resource due to an LBT failure, and the LBT counter (configured on the same serving cell where the transmission_attempt_counter is maintained) has not reached MaxLBT (configured on the same serving cell where the transmission_attempt_counter is maintained).

When a TB (which corresponds to the HARQ process ID of the transmission_attempt_counter state variable) is not transmitted on an UL resource due to the TB being deprioritized as a result of intra-UE prioritization, and the LBT counter (configured on the same serving cell where the transmission_attempt_counter is maintained) has not reached MaxLBT (configured on the same serving cell where the transmission_attempt_counter is maintained).

UL resource due to an LBT failure.

Specifically, the UL resource may be configured by the gNB via RRC. For example, configured grant Type 1 configuration (in which retransmissions on the corresponding configured uplink grant resources are allowed), configured grant Type 2 configuration (in which retransmissions on the corresponding configured uplink grant resources are allowed). Alternatively, the UL resource may be scheduled by the gNB via DCI. Specifically, if a transmission_attempt-counter reaches a maximum time, the UE may flush a HARQ buffer which corresponds to the transmission_attempt-counter.

In various implementations of the present disclosure, the transmission_attempt_counter (which corresponds to a specific HARQ process ID) may be reset if one or multiple of the following conditions are satisfied:

When the TB has been (re)transmitted on a configured uplink grant resource (which corresponds to the same HARQ process ID as the transmission_attempt-_counter). More specifically, the configured uplink grant resource may belong to a configured grant Type 1 configuration (in which retransmissions on the corresponding configured uplink grant resources are allowed), configured grant Type 2 configuration (in which retransmissions on the corresponding configured uplink grant resources are allowed), etc.

When the TB has been retransmitted on a UL resource scheduled by the network for dynamic transmission (which corresponds to the same HARQ process ID as the transmission_attempt_counter).

Upon MAC reset/reconfiguration.

When the serving cell where the transmission_attempt-_counter is maintained has been deactivated.

If the LBT counter (configured on the same serving cell where the transmission_attempt_counter is maintained) has reached MaxLBT (configured on the same serving cell where the transmission_attempt_counter is maintained).

If an RA procedure, which is initiated by a UE due to consistent UL LBT failures (e.g., LBT counter is equal to or larger than MaxLBT), has been initiated.

If an RA procedure, which is initiated by a UE due to consistent UL LBT failures (e.g., LBT counter is equal to or larger than MaxLBT), has been completed.

The BWP (which corresponds to the TB that starts this transmission_attempt_counter) is deactivated.

BWP switching is performed.

BFR is detected on the serving cell (which corresponds to the TB where transmission_attempt_counter is maintained).

If the HARQ buffer which corresponds to the transmission_attempt_counter has been flushed/overwritten by another TB.

Upon MAC reset/reconfiguration.

If the configured grant corresponding to the transmission-_attempt_counter is (re-)activated, deactivated and/or released. For example, the transmission_attempt-_counter is (re)started when a failed transmission happens on the configured grant due to an LBT failure.

Effects of the LBT Recovery Procedure to Configured Uplink Grant Resource Retransmission As mentioned above, the LBT recovery procedure may be initiated by a UE when specific conditions are met, e.g., whenever the LBT counter reaches MaxLBT (and if LBT fails on all the sub-bands within the UE's current BWP). For example, an LBT recovery procedure may include, but is not limited to be, at least one of the following procedures:

BWP switching to a specific BWP. For example, a UE may switch to its initial/default/indicated BWP. The network may provide such an indication to the UE via RRC signaling/MAC CE/DCI signaling.

UE switches the active DL and/or UL BWP to the BWP indicated by firstActiveDownlinkBWP-Id and firstActiveUplinkBWP-Id respectively. Wherein the firstActiveDownlinkBWP-Id and firstActiveUplinkBWP-Id were configured by the gNB via DL RRC signaling.

BWP switching to any BWP other than the current BWP.

Declares RLF (if consecutive or consistent UL LBT failures are detected on a serving cell which belongs to the MCG).

In one example, a UE may initiate RRC connection re-establishment procedure if the LBT counter maintained by a serving cell, which belongs to the MCG, reaches MaxLBT. Specifically, the procedure may be performed if consistent UL LBT failures have been detected in all the BWPs configured with PRACH resources on the PCell.

Initiation of the procedure to report SCG failures if consecutive or consistent UL LBT failures are detected on a serving cell which belongs to an SCG.

In one example, a UE may initiate the procedure to report SCG failures if the LBT counter maintained by a serving cell, which belongs to a SCG, reaches MaxLBT. Specifically, this procedure may be performed on the MCG if consecutive or consistent UL LBT failures are detected on a PSCell. Specifically, this procedure may be performed on the PSCell if consecutive or consistent UL LBT failures are detected on a serving cell other than the PSCell. Specifically, the procedure may be performed if consistent UL LBT failures have been detected in all the BWPs configured with PRACH resources on the PSCell.

Initiation of RA procedure (on the PCell/PSCell).

Sending a failure report, which corresponds to the serving cell where consecutive or consistent UL LBT failures are detected.

In one example, if the LBT counter maintained by a serving cell with ID=2 reaches MaxLBT (configured in serving cell with ID=2), the UE may send a failure report (on another serving cell), which includes information related to this serving (e.g., indicates cell ID=2) to the network.

In one example, if the LBT counter maintained by PSCell (in DC scenario) reaches MaxLBT (configured in the PSCell), the UE may send a failure report, which includes information related to the PSCell to the network.

In one example, if the LBT counter maintained by PSCell (in DC scenario) reaches MaxLBT (configured in the PSCell) for the UEs current active BWP, the UE may send a SCG failure report, which includes information related to the PSCell to the network, only if consistent UL LBT failures have been detected on all the BWPs configured with PRACH resources on the PSCell.

Deactivation of the serving cell where consecutive or consistent UL LBT failures are detected (e.g., LBT counter reaches MaxLBT of this serving cell).

In one example, if the LBT counter maintained by a serving cell with ID=2 reaches MaxLBT (configured in serving cell with ID=2), the serving cell with ID=2 is deactivated.

In various implementations of the present disclosure, it is assumed that if a pending TB has not been transmitted on a configured uplink grant resource (due to an LBT failure), it may be (re)transmitted in a (subsequent) configured uplink grant resource (with the same HARQ process ID). However, the condition(s) (e.g., the LBT counter reaches the configured MaxLBT) to initiate an LBT recovery procedure may also be satisfied before this TB is (re)transmitted in another configured uplink grant resource (with the same HARQ process). If the UE behavior is that (re)transmission in a (subsequent) configured uplink grant resource (with the same HARQ process) is not allowed upon initiation of LBT recovery procedure, at least one of the candidate UE behaviors as listed below may be performed:

A UE flushes all HARQ buffers (configured for configured grant configuration(s)) if specific condition(s) to initiate LBT recovery procedure is satisfied.

Specifically, the specific condition may be that LBT counter is equal to or larger than the configured MaxLBT. Specifically, the UE may flush all the HARQ buffers (configured for configured grant configuration(s)) which correspond to a serving cell where LBT failure problem is detected, e.g., LBT counter maintained for this serving cell reaches the MaxLBT.

A UE flushes all HARQ buffers (configured for configured grant configuration(s)) upon BWP switching (if BWP switching is performed as part of LBT recovery procedure) Specifically, the UE may flush all the HARQ buffers (configured for configured grant configuration(s)) which correspond to a serving cell where LBT failure problem is detected, e.g., LBT counter maintained for this serving cell reaches the MaxLBT.

A UE flushes all the HARQ buffers (configured for configured grant configuration(s)) upon initiation of a RA procedure (if this RA procedure is initiated as part of LBT recovery procedure).

Specifically, the UE may flush all the HARQ buffers (configured for configured grant configuration(s)) which correspond to a serving cell where LBT failure problem is detected, e.g., LBT counter maintained for this serving cell reaches the MaxLBT.

A UE flushes all the HARQ buffers (configured for configured grant configuration(s)) upon RA procedure completion (if this RA procedure is initiated as part of LBT recovery procedure).

Specifically, the UE may flush all the HARQ buffers (configured for configured grant configuration(s)) which correspond to a serving cell where LBT failure problem is detected, e.g., LBT counter maintained for this serving cell reaches the MaxLBT.

A UE flushes specific HARQ buffers if specific condition(s) to initiate LBT recovery procedure is satisfied.

Specifically, the specific condition may be that LBT counter is equal to or larger than the configured MaxLBT. In one implementation, the UE may flush specific HARQ buffers which correspond to a serving cell if the LBT counter configured for this serving cell is equal to or larger than the configured MaxLBT.

Specifically, the UE may flush the specific HARQ buffer(s) which correspond to a serving cell where LBT failure problem is detected, e.g., LBT counter maintained for this serving cell reaches the MaxLBT.

A UE flushes specific HARQ buffer(s) upon BWP switching (if BWP switching is performed as part of LBT recovery procedure).

Specifically, the UE may flush the specific HARQ buffer(s) which correspond to a serving cell where LBT failure problem is detected, e.g., LBT counter maintained for this serving cell reaches the MaxLBT.

A UE flushes specific HARQ buffer(s) upon initiation of a RA procedure (if this RA procedure is initiated as part of LBT recovery procedure).

Specifically, the UE may flush the specific HARQ buffer(s) which correspond to a serving cell where LBT failure problem is detected, e.g., LBT counter maintained for this serving cell reaches the MaxLBT.

A UE flushes specific HARQ buffer(s) upon RA procedure completion (if this RA procedure is initiated as part of LBT recovery procedure).

Specifically, the UE may flush the specific HARQ buffer(s) which correspond to a serving cell where LBT failure problem is detected, e.g., LBT counter maintained for this serving cell reaches the MaxLBT.

A UE consider all timeAlignmentTimer(s) as expired if specific condition(s) to initiate LBT recovery procedure is satisfied.

Specifically, the specific condition may be that LBT counter is equal to or larger than the configured MaxLBT.

A UE consider all timeAlignmentTimer(s) as expired upon BWP switching (if BWP switching is performed as part of LBT recovery procedure).

A UE considers all timeAlignmentTimer(s) as expired upon initiation of a RA procedure (if this RA procedure is initiated as part of LBT recovery procedure).

A UE considers all timeAlignmentTimer(s) as expired upon RA procedure completion (if this RA procedure is initiated as part of LBT recovery procedure).

A UE considers specific timeAlignmentTimer(s) as expired if specific condition(s) to initiate LBT recovery procedure is satisfied.

Specifically, the specific condition may be that LBT counter is equal to or larger than the configured MaxLBT.

A UE considers specific timeAlignmentTimer(s) as expired upon BWP switching (if BWP switching is performed as part of LBT recovery procedure).

A UE considers specific timeAlignmentTimer(s) as expired upon initiation of a RA procedure (if this RA procedure is initiated as part of LBT recovery procedure).

A UE considers specific timeAlignmentTimer(s) as expired upon RA procedure completion (if this RA procedure is initiated as part of LBT recovery procedure).

In some implementations of the present disclosure, a specific HARQ buffer may be any HARQ buffer with pending TBs.

In some implementations of the present disclosure, a specific HARQ buffer may be a HARQ buffer with pending TB due to unsuccessful transmission on an UL resource. Specifically, the transmission may be unsuccessful due to the detection of LBT failure, intra-UE prioritization (e.g., the UL resource is deprioritized as a result of intra-UE prioritization), etc. Specifically, the UL resource may be configured via RRC signaling (e.g., configured grant Type 1 (in which retransmissions on the corresponding configured uplink grant resources are allowed), configured grant Type 2 (in which retransmissions on the corresponding configured uplink grant resources are allowed), etc.) or scheduled via DCI signaling (e.g., dynamic grant).

In the case where consecutive or consistent UL LBT failure(s) is detected on a SCell (e.g., LBT-related parameters and counters, such as LBT timer, MaxLBT, LBT counter, etc., are maintained/configured on the SCell), a specific timeAlignmentTimer may be referred a timeAlignmentTimer associated with a STAG that this SCell belongs to.

In the case where consecutive or consistent UL LBT failure(s) is detected on a SpCell (e.g., LBT-related parameters and counters, such as LBT timer, MaxLBT, LBT counter, etc., are maintained/configured on the SpCell), a specific timeAlignmentTimer may be referred a timeAlignmentTimer associated with the PTAG.

In one example, upon the LBT counter reaches configured MaxLBT (LBT counter is equal to or larger than MaxLBT), a UE may perform the following actions in sequential order:

Flushes the HARQ buffer(s) with pending TB due to unsuccessful transmission on configured uplink grant resource.

Initiates LBT recovery procedure, which involves a RA procedure initiation upon BWP switching.

In various implementations of the present disclosure, upon the LBT counter reaches configured MaxLBT (LBT counter is equal to or larger than MaxLBT) for a SCell (assuming the LBT-related parameters and counters, such as LBT timer, MaxLBT, LBT counter, etc., are maintained/configured on the SCell), a UE may perform the following actions in sequential order:

Considers the timeAlignmentTimer associated with the STAG that this SCell belongs to as expired.

In this sense, all the HARQ buffers that belongs to the serving cells of this STAG may be flushed.

Initiates LBT recovery procedure, which involves a RA procedure initiation upon BWP switching.

Reporting UL LBT Failure

In one implementation of the present disclosure, if the condition to initiate an LBT recovery procedure is satisfied (e.g., consecutive or consistent UL LBT failures), and this LBT recovery procedure includes (at least) RLF declaration (e.g., consistent UL LBT failures have been detected on the PCell), the UE may initiate an RRC connection re-establishment procedure and send a RRCReestablishmentRequest message (in the SpCell and/or after BWP switching) in order to report UL LBT problem to the network.

In one implementation, the LBT recovery procedure may include (at least) RLF declaration if consistent UL LBT failures have been detected on all the BWPs configured with PRACH resources on the PCell.

In another implementation of the present disclosure, a new entry may be added to the ReestablishmentCause IE in the RRCReestablishmentRequest message to explicitly indicate that there is an UL LBT problem. Specifically, the ReestablishmentCause IE may explicitly indicate that there is a SCG UL LBT problem if the UL LBT problem is detected on a serving cell that belongs to the SCG (e.g., LBT counter configured on this serving cell reaches the configured MaxLBT). This may be done by introducing a new entry to the ReestablishmentCause IE. For example, the ReestablishmentCause IE may explicitly indicate that there is an MCG UL LBT problem if the UL LBT problem is detected on a serving cell that belongs to the MCG (e.g., LBT counter configured on this serving cell reaches the configured MaxLBT). This may be done by introducing a new entry to the ReestablishmentCause IE, which may be presented in Table 1.

TABLE 1

Introducing a new entry (UL-LBT-Problem-MCG) to the ReestablishmentCause IE in RRCReestablishmentRequest message -- ASN1START
-- TAG-RRCREESTABLISHMENTREQUEST-START
(Some texts are omitted here)
ReestablishmentCause::= ENUMERATED {reconfigurationFailure, handoverFailure, otherFailure, UL-LBT-Problem-MCG}
(Some texts are omitted here)
-- TAG-RRCREESTABLISHMENTREQUEST-STOP
-- ASN1STOP In one implementation of the present disclosure, if the condition to initiate an LBT recovery procedure is satisfied (e.g., consecutive or consistent UL LBT failures) and this LBT recovery procedure includes (at least) SCG failure reporting (e.g., a procedure to report SCG failure), the UE may send a SCGFailureInformation message (via a cell that belongs to the MCG or via the PSCell) to the network in order to report the UL LBT problem in the SCG (in DC). In another implementation of the present disclosure, a new entry may be added to the failure Type IE in this message to explicitly indicate that there is an UL LBT problem in the SCG. An example may be found Table 2.

In one implementation, the LBT recovery procedure may include (at least) SCG failure reporting (e.g., a procedure to report SCG failure) if consistent UL LBT failures have been detected on all the BWPs configured with PRACH resources on the PSCell.

TABLE 2

Introducing a new entry (UL-LBT-Problem-SCG) to the
failureType IE in SCGFailureInformation message

```
-- ASN1START
-- TAG-SCGFAILUREINFORMATION-START
(Some texts are omitted here)
FailureReportSCG:: =           SEQUENCE {
    failureType                ENUMERATED {
                                  t310-Expiry, randomAccessProblem,
                                  rlc-MaxNumRetx,
                                  synchReconfigFailureSCG, scg-
ReconfigFailure,
                                  srb3-IntegrityFailure, UL-LBT-
Problem-SCG, spare1},
    measResultFreqList                           OPTIONAL,
    measResultSCG-Failure    OCTET STRING (CONTAINING MeasResultSCG-Failure)
OPTIONAL,
    ...
}
Some texts are omitted here)
```

In one implementation of the present disclosure, the master gNB/master eNB may send a CG-ConfigInfo message to the secondary gNB/secondary eNB to request for establish/modify/or release an SCG. In another implementation of the present disclosure, a new entry may be added to the failureType IE in this message to explicitly indicate that there is an UL LBT problem in the SCG. An example may be found Table 3.

TABLE 3

Introducing a new entry (UL-LBT-Problem-SCG) to
the failureType IE in CG-ConfigInfo message

```
-- ASN1START
-- TAG-CG-CONFIG-INFO-START
(Some texts are omitted here)
CG-ConfigInfo-IEs:: =    SEQUENCE {
    scgFailureInfo           SEQUENCE {
        failureType              ENUMERATED {t310-Expiry, randomAccessProblem,
                                  rlc-MaxNumRetx, synchReconfigFailure-SCG,
                                  scg-reconfigFailure,
                                  srb3-InteqrityFailure, UL-LBT-Problem-SCG},
        measResultSCG          OCTET STRING (CONTAINING MeasResultSCG-Failure)
    }
OPTIONAL,
(Some texts are omitted here)
}
(Some texts are omitted here)
-- TAG-CG-CONFIG-INFO-STOP
-- ASN1STOP
```

In one implementation of the present disclosure, if the condition to initiate an LBT recovery procedure is satisfied (e.g., consecutive or consistent UL LBT failures) and this procedure includes (at least) a RA procedure, a UE may transmit a dedicated preamble. Moreover, the dedicated preamble may be transmitted on dedicated PRACH resource. For example, the dedicated preamble and dedicated PRACH resource may be configured by the network via RRC signaling/DCI signaling.

In one example, if the condition to initiate an LBT recovery procedure is satisfied (e.g., consecutive or consistent UL LBT failures) and this procedure includes (at least) BWP switching, a UE may trigger a MAC CE generation/reporting/transmission/confirmation. Subsequently, if a MAC CE generation/reporting/transmission/confirmation has been triggered, the UE may transmit this MAC CE in a scheduled/configured UL resource (e.g., PUSCH resource) to the network. The purpose of this MAC CE may be to inform the network that LBT recovery procedure has been initiated due to specific conditions (e.g., consecutive or consistent UL LBT failures).

Specifically, the MAC CE may include (but is not limited to) one or multiple of the following information:

- The identity of the BWP (e.g., BWP ID) where consecutive or consistent UL LBT failures are detected (or other conditions which results in the initiation of LBT recovery procedure).
- The identity of the serving cell (e.g., BWP ID) where consecutive or consistent UL LBT failures UL LBT failures are detected (or other conditions results in the initiation of LBT recovery procedure).
- The identity of the CG (e.g., MCG or SCG) where consecutive or consistent UL LBT failures are detected (or other conditions which results in the initiation of LBT recovery procedure).
- The identity of the BWP (e.g., BWP ID) where LBT recovery procedure (e.g., RA procedure) is initiated.
- The identity of the serving cell (e.g., BWP ID) where LBT recovery procedure (e.g., RA procedure) is initiated.

The identity of the BWP (e.g., BWP ID) where the UE switches to (as part of the LBT recovery procedure).

The identity of the serving cell (e.g., serving cell ID) where the UE deactivates to (as part of the LBT recovery procedure).

Figure 7:
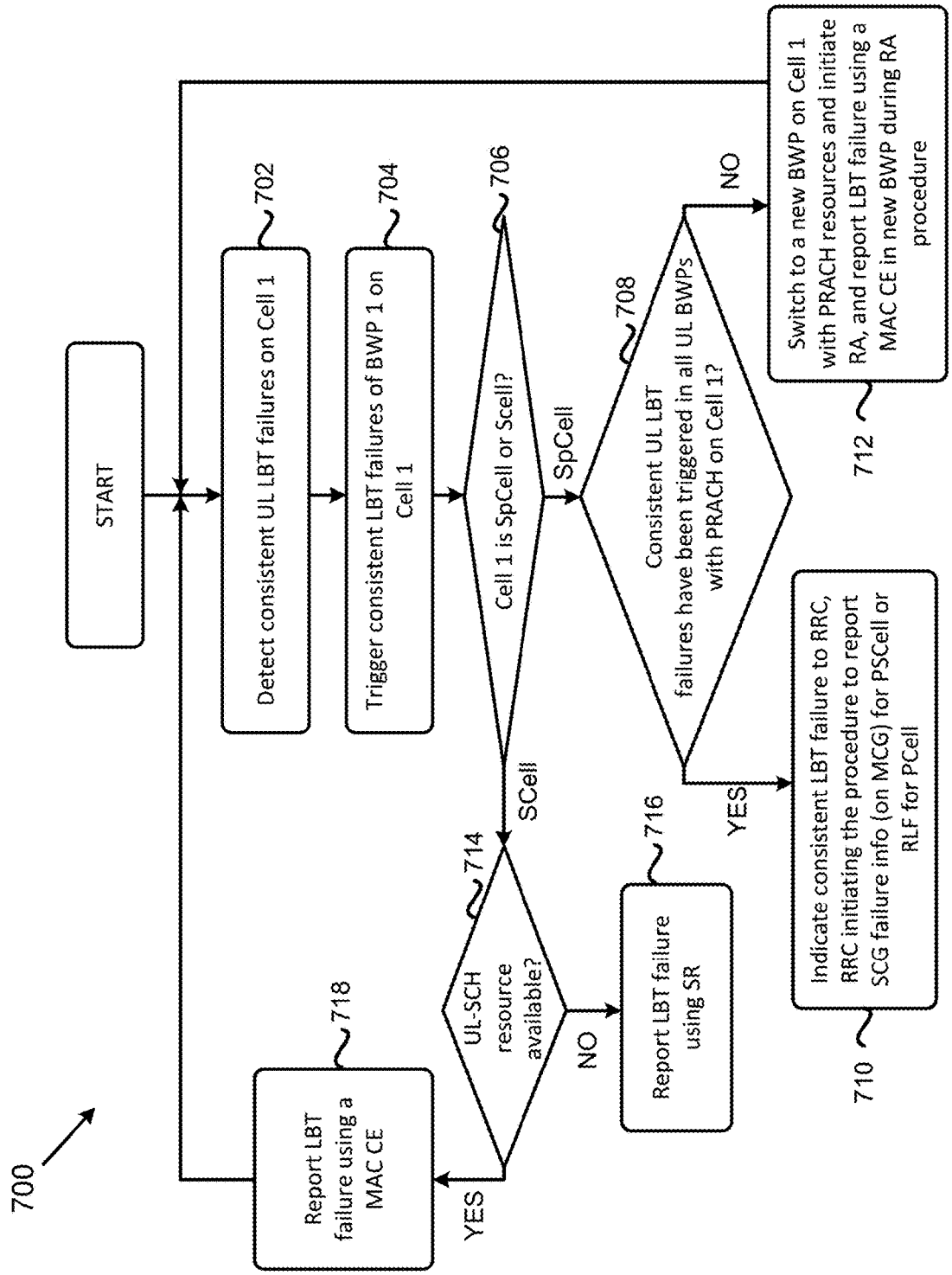
FIG. 7 illustrates a flowchart of a method by a UE for LBT recovery and reporting procedures, according to an example implementation of the present disclosure.

FIG. 7 illustrates a flowchart 700 of a method by a UE for an LBT recovery and reporting procedures, according to an example implementation of the present disclosure. As shown in FIG. 7, in action 702, the UE may detect consistent UL LBT failures on a serving cell (e.g., Cell 1). For example, the LBT counter maintained for this serving cell reaches the MaxLBT threshold. In action 704, the UE may trigger a consistent UL LBT failures of a BWP (BWP1) on the serving cell (e.g., Cell 1). In action 706, the UE may determine whether the serving cell is an SpCell or SCell. In action 708, if the serving cell is an SpCell, the UE may determine whether the consistent UL LBT failures have been triggered in all UL BWPs with PRACH on the serving cell.

In action 710, if the consistent UL LBT failures have been triggered in all UL BWPs with PRACH on the serving cell, the UE may indicate consistent UL LBT failures to the RRC layer. For example, the RRC layer may initiate a procedure to report secondary cell group (SCG) failure information (on master cell group (MCG)) for the primary secondary cell (PSCell) or radio link failure (RLF) for the primary cell (PCell). In action 712, if the consistent UL LBT failures have not been triggered in all UL BWPs with the PRACH on the serving cell, the UE may switch to a new BWP on the serving cell (e.g., Cell 1) with PRACH resources and initiate a random access procedure, and report the LBT failure in a MAC CE in the new BWP during the RA procedure. As illustrated in FIG. 7, the flowchart 700 proceeds from action 712 to action 702.

In action 714, if the serving cell is an SCell, the UE may determine whether a UL-SCH resource is available. In action 716, if a UL-SCH resource is not available, the UE may report the LBT failure using a scheduling request (SR). In action 718, if a UL-SCH resource is available, the UE may report the LBT failure using a MAC CE using the available UL-SCH resource. As illustrated in FIG. 7, the flowchart 700 proceeds from action 718 to action 702.

Figure 8:
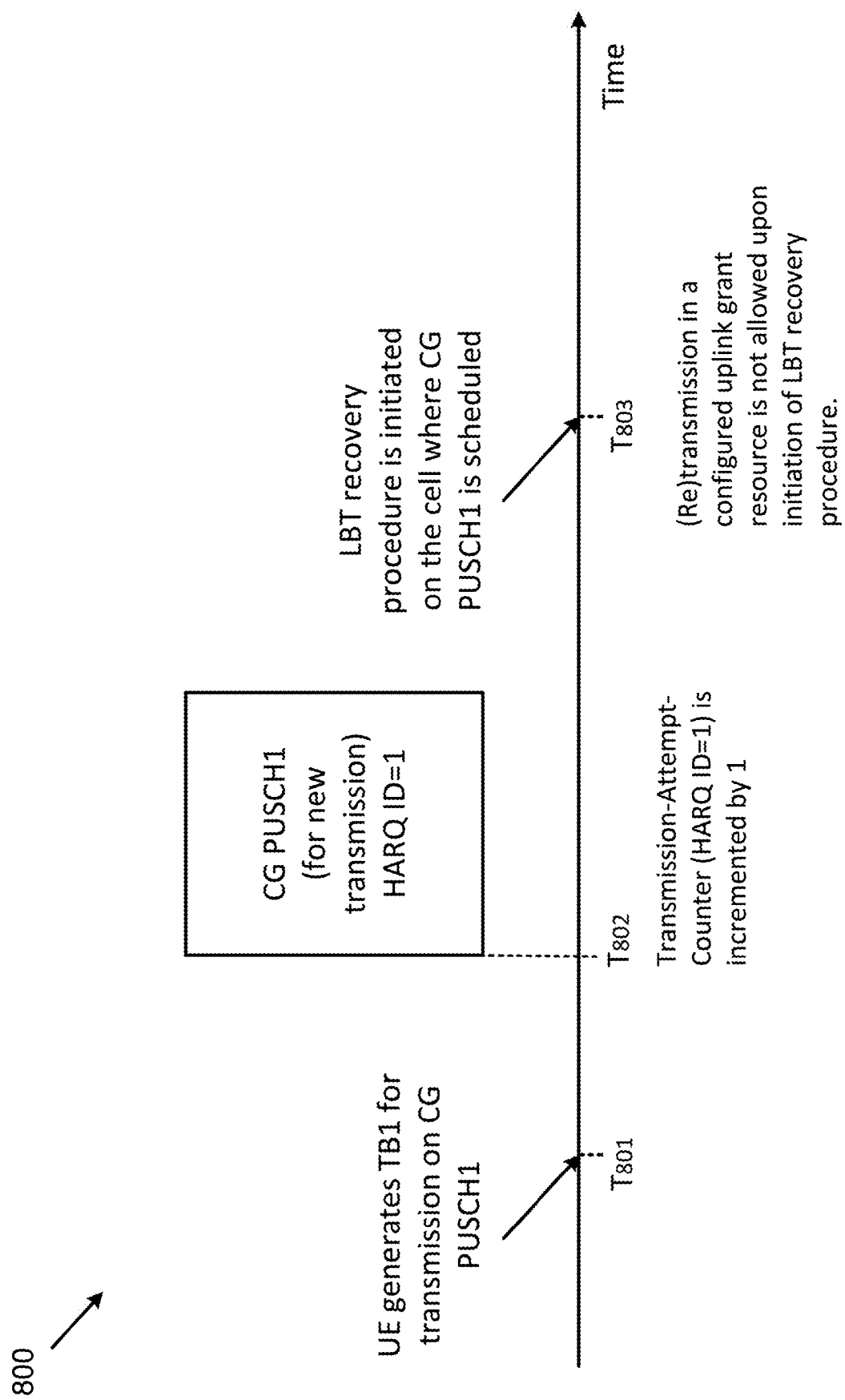
FIG. 8 illustrates a diagram of the UE behavior upon initiation of an LBT recovery procedure, according to an example implementation of the present disclosure.

FIG. 8 illustrates a diagram of the UE behavior upon initiation of an LBT recovery procedure, according to an example implementation of the present disclosure. As shown in the diagram 800, at time T801, the UE generates a TB1 for transmission on configured grant (CG) PUSCH1. At time T802, the UE attempts to transmit the TB1 on the CG PUSCH1, but fails due to an LBT failure or intra-UE prioritization (e.g., CG PUSCH1 is deprioritized as a result of intra-UE prioritization), for example. At time T803, the UE initiates an LBT recovery procedure on the cell where CG PUSCH is scheduled. In the present implementation, it is assumed that (re)transmission in a (subsequent) configured uplink grant resource (with the same HARQ process) is not allowed upon an initiation of an LBT recovery procedure. The UE may flush all HARQ buffers and consider the time Alignment Timer as expired.

Figure 9:
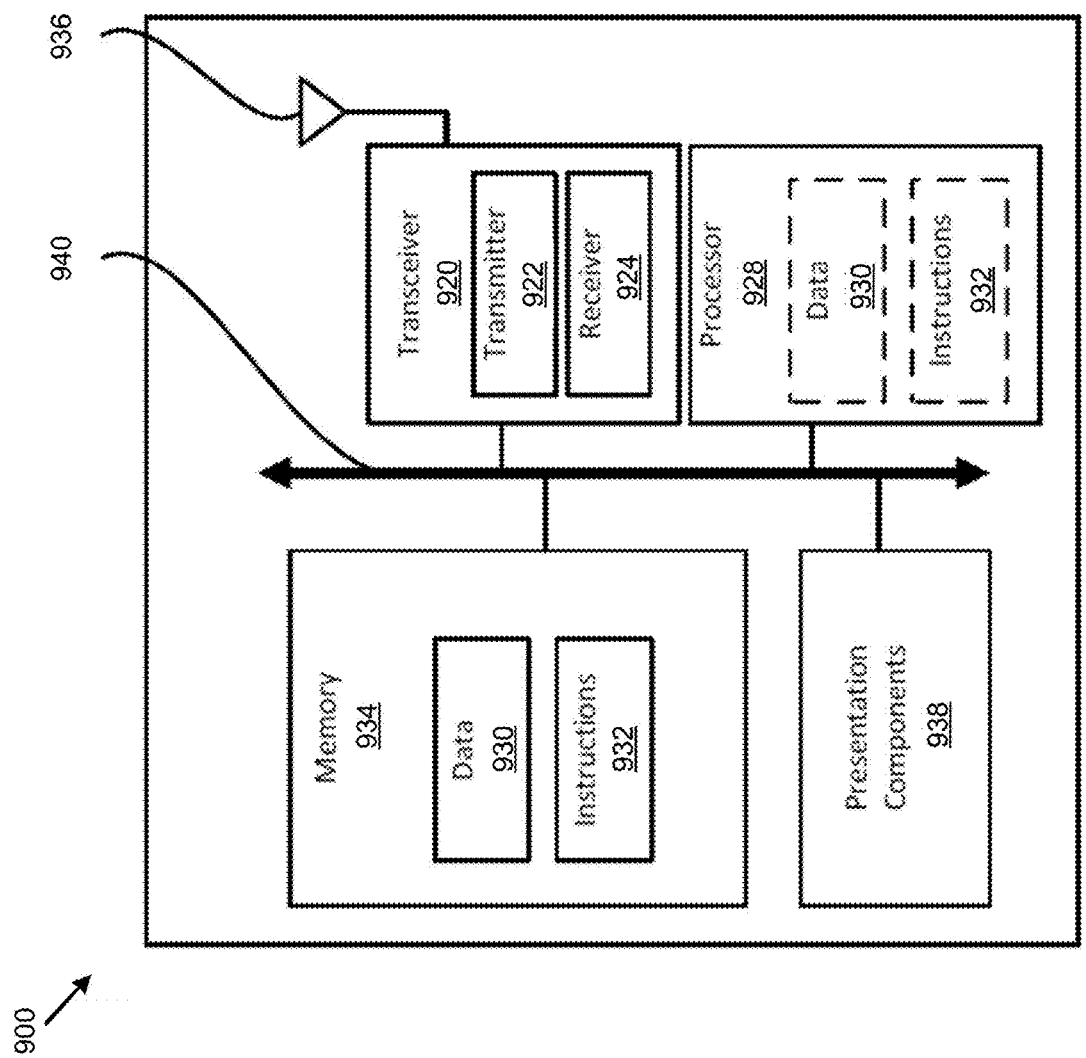
FIG. 9 is a block diagram illustrating a node for wireless communication, according to various aspects of the present disclosure.

FIG. 9 is a block diagram illustrating a node for wireless communication, according to various aspects of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 2 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including but not limited to usable, non-usable and flexibly usable subframes and slot formats. The transceiver 920 may be configured to receive data and control channels.

The node 900 may include a variety of computer-readable media. Computer-readable media may be any available media that may be accessed by the node 900 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store computer-readable, computer-executable instructions 932 (e.g., software codes) that are configured to cause the processor 928 to perform various functions disclosed herein, for example, with reference to FIGS. 2 through 8. Alternatively, the instructions 932 may not be directly executable by the processor 928 but be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the instructions 932 received from the memory 934, and information transmitted and received via the transceiver 920, the baseband communications module, and/or the network communications module. The processor 928 may also process information to be sent to the transceiver 920 for transmission via the antenna 936 to the network communications module for transmission to a core network.

One or more presentation components 938 may present data indications to a person or another device. Examples of presentation components 938 may include a display device, a speaker, a printing component, and a vibrating component, etc.

In various implementations of the present disclosure, the CC may be PCell, PSCell, and/or SCell.

In various implementations of the present disclosure, the SpCell may include PCell and PSCell.

In various implementations of the present disclosure, the UL resource may be RACH resource, PUCCH resource, and/or PUSCH resource. The UL resource may be scheduled by dynamic grant (e.g., via PDCCH) and/or configured by RRC (e.g., type 1/type 2 configured UL grant or preconfigured in RRC configuration). When a beam failure (of an SCell(s)) is detected, the UE may trigger a BFR procedure (for an SCell(s)).

In various implementations of the present disclosure, the MAC entity may be referred to the UE.

In various implementations of the present disclosure, intra-UE prioritization may be needed by a UE if two or more UL resources (scheduled/configured in the same serving cell) overlap in the time domain. As a result of intra-UE prioritization, the UE may select one of the overlapping UL resources for transmission. The selected UL resource may be referred to as a prioritized UL resource, and the MAC PDU/TB to be transmitted on the UL resource may be referred to as a prioritized MAC PDU/TB. In contrast, the UL resource(s) that is not selected may be referred to as a deprioritized UL resource(s), and the MAC PDU(s)/TB(s) to be transmitted on the deprioritized UL resource(s) may be referred to as a deprioritized MAC PDU(s)/TB(s).

In various implementations of the present disclosure, the overlap of the resource may mean partially overlap and/or fully overlap.

In various implementations of the present disclosure, the configured grant configuration may be (but is not limited to) configured grant Type 1 or configured grant Type 2.

In various implementations of the present disclosure, there are two types of transmission without dynamic grant: configured grant Type 1 where an uplink grant is provided by RRC, and stored as configured uplink grant; and configured grant Type 2 where an uplink grant is provided by PDCCH, and stored or cleared as configured uplink grant based on L1 signaling indicating configured uplink grant activation or deactivation.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE), comprising:
one or more non-transitory computer-readable media having computer-executable instructions embodied therein; and
at least one processor coupled to the one or more non-transitory computer-readable media, the at least one processor configured to execute the computer-executable instructions to cause the UE to:
determine that a transmission of a Medium Access Control (MAC) protocol data unit (PDU) using a first physical uplink shared channel (PUSCH) resource associated with a first configured grant (CG) configuration has not been successfully performed, the first PUSCH resource being associated with a first hybrid automatic repeat request (HARQ) process, and the MAC PDU being associated with the first HARQ process;
receive a second CG configuration;
determine that a second PUSCH resource associated with the second CG configuration is available for another transmission, the second PUSCH resource being associated with a second HARQ process;
determine that the second PUSCH resource is available for transmitting the MAC PDU when a first plurality of conditions is satisfied; and
transmit the MAC PDU on the second PUSCH resource after determining that the second PUSCH resource is available for transmitting the MAC PDU, wherein:
the first plurality of conditions comprises:
the second PUSCH resource available for the other transmission is used for a new transmission when at least one second condition is satisfied, the at least one second condition comprising a CG timer for the second HARQ process not running, and
the second PUSCH resource is scheduled on a same bandwidth part (BWP) as the first PUSCH resource.

2. The UE of claim 1, wherein the first plurality of conditions further comprises at least one of the following conditions:
the first HARQ process having a same HARQ process ID as the second HARQ process;
the second PUSCH resource having a same size as the first PUSCH resource;
the second CG configuration being the same as the first CG configuration; or
the second PUSCH resource being a prioritized PUSCH resource.

3. The UE of claim 1, wherein the at least one processor is further configured to execute the computer-executable instructions to cause the UE to:
determine that the second PUSCH resource is not available for transmitting the MAC PDU when at least one of the first plurality of conditions is not satisfied; and
generate a new MAC PDU and transmit the new MAC PDU on the second PUSCH resource after determining that the second PUSCH resource is not available for transmitting the MAC PDU.

4. The UE of claim 1, wherein the at least one second condition further comprises:
repetition not being configured for the second CG configuration.

5. The UE of claim 1, wherein the transmission of the MAC PDU using the first PUSCH resource associated with the first CG configuration is determined to have not been successfully performed when the first PUSCH resource associated with the first CG configuration is deprioritized.

6. The UE of claim 1, wherein when the transmission of the MAC PDU using the first PUSCH resource associated with the first CG configuration has not been successfully performed, the MAC PDU remains in a HARQ buffer associated with the first HARQ process.

7. The UE of claim 1, wherein the transmission of the MAC PDU using the first PUSCH resource associated with the first CG configuration is determined to have not been successfully performed based on an uplink (UL) Listen-Before-Talk (LBT) failure.

8. The UE of claim 7, wherein the at least one processor is further configured to execute the computer-executable instructions to cause the UE to:
    increment an LBT counter based on the UL LBT failure; and
    transmit a secondary cell group (SCG) failure report when the LBT counter reaches a threshold value configured on the BWP on which the first PUSCH resource is scheduled, wherein the BWP belongs to a Primary Secondary Cell (PSCell).

9. The UE of claim 8, wherein the SCG failure report is transmitted when consistent UL LBT failures have been detected on all BWPs configured with physical random access channel (PRACH) resources on the PSCell.

10. The UE of claim 8, wherein the SCG failure report includes a failure type information element (IE) indicating a failure type as an SCG LBT failure.

11. A method performed by a user equipment (UE), the method comprising:
    determining that a transmission of a Medium Access Control (MAC) protocol data unit (PDU) using a first physical uplink shared channel (PUSCH) resource associated with a first configured grant (CG) configuration has not been successfully performed, the first PUSCH resource being associated with a first hybrid automatic repeat request (HARQ) process, and the MAC PDU being associated with the first HARQ process;
    receiving a second CG configuration;
    determining that a second PUSCH resource associated with the second CG configuration is available for another transmission, the second PUSCH resource being associated with a second HARQ process;
    determining that the second PUSCH resource is available for transmitting the MAC PDU when a first plurality of conditions is satisfied; and
    transmitting the MAC PDU on the second PUSCH resource after determining that the second PUSCH resource is available for transmitting the MAC PDU, wherein:
    the first plurality of conditions comprises:
        the second PUSCH resource available for the other transmission is used for a new transmission when at least one second condition is satisfied, the at least one second condition comprising a CG timer for the second HARQ process not running, and
        the second PUSCH resource is scheduled on a same bandwidth part (BWP) as the first PUSCH resource.

12. The method of claim 11, wherein the first plurality of conditions further comprises at least one of the following conditions:
    the first HARQ process having a same HARQ process ID as the second HARQ process;
    the second PUSCH resource having a same size as the first PUSCH resource;
    the second CG configuration being the same as the first CG configuration; or
    the second PUSCH resource being a prioritized PUSCH resource.

13. The method of claim 11, further comprising:
    determining that the second PUSCH resource is not available for transmitting the MAC PDU when at least one of the first plurality of conditions is not satisfied; and
    generating a new MAC PDU and transmitting the new MAC PDU on the second PUSCH resource after determining that the second PUSCH resource is not available for transmitting the MAC PDU.

14. The method of claim 11, wherein the at least one second condition further comprises:
    repetition not being configured for the second CG configuration.

15. The method of claim 11, wherein the transmission of the MAC PDU using the first PUSCH resource associated with the first CG configuration is determined to have not been successfully performed when the first PUSCH resource associated with the first CG configuration is deprioritized.

16. The method of claim 11, wherein when the transmission of the MAC PDU using the first PUSCH resource associated with the first CG configuration has not been successfully performed, the MAC PDU remains in a HARQ buffer associated with the first HARQ process.

17. The method of claim 11, wherein the transmission of the MAC PDU using the first PUSCH resource associated with the first CG configuration is determined to have not been successfully performed based on an uplink (UL) Listen-Before-Talk (LBT) failure.

18. The method of claim 17, further comprising:
    incrementing an LBT counter based on the UL LBT failure; and
    transmitting a secondary cell group (SCG) failure report when the LBT counter reaches a threshold value configured on the BWP on which the first PUSCH resource is scheduled, wherein the BWP belongs to a Primary Secondary Cell (PSCell).

19. The method of claim 18, wherein the SCG failure report is transmitted when consistent UL LBT failures have been detected on all BWPs configured with physical random access channel (PRACH) resources on the PSCell.

20. The method of claim 18, wherein the SCG failure report includes a failure type information element (IE) indicating a failure type as an SCG LBT failure.

* * * * *